(12) United States Patent
Ito et al.

(10) Patent No.: US 7,057,690 B2
(45) Date of Patent: Jun. 6, 2006

(54) OPTICAL COMPENSATORY SHEET HAVING OPTICALLY ANISOTROPIC LAYER FORMED FROM LIQUID CRYSTAL MOLECULES

(75) Inventors: Yoji Ito, Kanagawa (JP); Ken Kawata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/108,655

(22) Filed: Apr. 19, 2005

(65) Prior Publication Data

US 2005/0200780 A1 Sep. 15, 2005

Related U.S. Application Data

(62) Division of application No. 09/913,649, filed as application No. PCT/JP00/00612 on Feb. 4, 2000, now Pat. No. 6,937,307.

(30) Foreign Application Priority Data

| Feb. 17, 1999 | (JP) | ................................. 11-038893 |
| Dec. 21, 1999 | (JP) | ................................. 11-362224 |
| Jan. 14, 2000 | (JP) | ................................. 2000-006772 |
| Jan. 14, 2000 | (JP) | ................................. 2000-006773 |

(51) Int. Cl.
*G02F 1/13* (2006.01)
*G02F 1/1335* (2006.01)

(52) U.S. Cl. .................. 349/117; 349/96; 349/104; 349/193

(58) Field of Classification Search ............... 349/117, 349/96, 104, 193

See application file for complete search history.

(56) References Cited

U.S. PATENT DOCUMENTS

| 5,528,400 | A | 6/1996 | Arakawa |
| 6,064,457 | A | 5/2000 | Aminaka |
| 6,245,398 | B1 | 6/2001 | Matsuoka et al. |
| 6,380,996 | B1 | 4/2002 | Yokoyama et al. |
| 6,519,017 | B1 * | 2/2003 | Ichihashi et al. ........... 349/117 |
| 6,606,140 | B1 * | 8/2003 | Ito et al. ..................... 349/123 |
| 2002/0149725 | A1 * | 10/2002 | Hashimoto .................. 349/117 |

OTHER PUBLICATIONS

International Search Report issued in PCT/JP00/00612; May 16, 2000.
Translation of International Preliminary Examination Report, 9 pages; Feb. 20, 2001.

* cited by examiner

*Primary Examiner*—Huyen Ngo
(74) *Attorney, Agent, or Firm*—Buchanan Ingersoll PC

(57) ABSTRACT

The optical compensatory sheet has a transparent support and an optically anisotropic layer formed from liquid crystal molecules aligned in an average inclined angle of less than 5°. The optical compensatory sheet gives the retardation value in plane (Re) in the range of 10 to 1,000 nm and the retardation value along the thickness direction (Rth) in the range of 10 to 1,000 nm.

5 Claims, 1 Drawing Sheet

OPTICAL COMPENSATORY SHEET HAVING OPTICALLY ANISOTROPIC LAYER FORMED FROM LIQUID CRYSTAL MOLECULES

CROSS-REFERENCE TO RELATED APPLICATIONS

This application is a divisional of U.S. patent application Ser. No. 09/913,649, filed Aug. 17, 2001, now U.S. Pat. No. 6,937,307 which, in turn, is a 371 of Application No. PCT/JP00/00612, filed Feb. 4, 2000, claiming priority of Japanese Application No. 11-038893, filed Feb. 17, 1999, Japanese Application No. 11-362224, filed Dec. 21, 1999, Japanese Application No. 2000-006773, filed Jan. 14, 2000, which applications are hereby incorporated by reference.

FIELD OF INVENTION

The present invention relates to an optical compensatory sheet having an optically anisotropic layer formed from liquid crystal molecules. The invention also relates to an elliptically polarizing plate and a liquid crystal display equipped with that optical compensatory sheet.

PRIOR ART

A liquid crystal display generally has a liquid crystal cell, a polarizing element and an optical compensatory sheet (phase retarder). In a display of transmission type, two polarizing elements are placed on both sides of the liquid crystal cell, and one or two optical compensatory sheets are placed between the liquid crystal cell and the polarizing element. On the other hand, a display of reflection type comprises a reflection plate, a liquid crystal cell, one optical compensatory sheet and one polarizing element piled up in this order.

The liquid crystal cell comprises a pair of substrates, rod-like liquid crystal molecules and an electrode layer. The rod-like liquid crystal molecules are provided between the substrates, and the electrode layer has a function of applying a voltage to the rod-like liquid crystal molecules. According to alignment of the rod-like liquid crystal molecules in the cell, various display modes are proposed. Examples of the display modes for transmission type include TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and ECB (electrically controlled birefringence) mode. Examples of the modes for reflection type include TN mode, HAN (hybrid aligned nematic) mode and GH (guest-host) mode.

The optical compensatory sheet is widely used in various liquid crystal displays because it prevents the displayed image from undesirable coloring and enlarges a viewing angle of a liquid crystal cell. As the optical compensatory sheet, a stretched birefringent polymer film has been conventionally used.

In place of the stretched birefringent polymer film, an optical compensatory sheet having an optically anisotropic layer formed from liquid crystal molecules has been proposed. The optically anisotropic layer is provided on a transparent support. Since the liquid crystal molecules have various alignment forms, an optical compensatory sheet obtained from the liquid crystal molecules has a specific optical characteristic that cannot be obtained from the conventional stretched birefringent polymer film.

The optical characteristic of the optical compensatory sheet is designed according to that of the liquid crystal cell, namely, according to display mode of the liquid crystal cell. If the optical compensatory sheet is made with liquid crystal molecules, various optical characteristics can be realized according to the display mode of the liquid crystal cell.

For liquid crystal cells of various display modes, optical compensatory sheets using liquid crystal molecules have been proposed. For example, the optical compensatory sheet for liquid crystal cell of TN mode is described in Japanese Patent Provisional Publication No. 6(1994)-214116, U.S. Pat. Nos. 5,583,679, 5,646,703 and German Patent Publication No. 3,911,620A1. The compensatory sheet for liquid crystal cell of IPS or FLC mode is described in Japanese Patent Provisional Publication No. 10(1998)-54982. The compensatory sheet for OCB or HAN mode is described in U.S. Pat. No. 5,805,253 and International Patent Application No. WO96/37804. The compensatory sheet for STN mode is described in Japanese Patent Provisional Publication No. 9(1997)-26572. The compensatory sheet for VA mode is described in Japanese Patent No. 2,866,372.

SUMMARY OF THE INVENTION

Optical compensation for liquid crystal cells can be realized more correctly than before by the optical compensatory sheet using liquid crystal molecules in place of a conventional stretched birefringent polymer film.

However, the present inventors note that the conventional optical compensatory sheet cannot effectively optically compensate a liquid crystal cell comprising many essentially vertically aligned rod-like liquid crystal molecules (e.g., liquid crystal cell of VA, OCB or HAN mode).

Accordingly, an object of the invention is to provide an optical compensatory sheet that can optically compensate effectively a liquid crystal cell comprising many essentially vertically aligned rod-like liquid crystal molecules.

The invention provides an optical compensatory sheet having a transparent support and an optically anisotropic layer formed from liquid crystal molecules aligned in an average inclined angle of less than 5°, wherein the optical compensatory sheet has a retardation value in plane defined by the following formula in the range of 10 to 1,000 nm, and a retardation value along the thickness direction defined by the following formula in the range of 10 to 1,000 nm:

$$Re = (nx - ny) \times d$$

$$Rth = [\{(nx + ny)/2\} - nz] \times d$$

in which Re is the retardation value in plane; Rth is the retardation value along the thickness direction; each of nx and ny is a refractive index in the plane of the optical compensatory sheet; nz is a refractive index along the thickness direction of the optical compensatory sheet; and d is the thickness of the optical compensatory sheet.

The invention also provides an elliptically polarizing plate comprising a transparent protective film, a polarizing membrane, and an optical compensatory sheet having a transparent support and an optically anisotropic layer formed from liquid crystal molecules aligned in an average inclined angle of less than 5°, wherein the optical compensatory sheet has a retardation value in plane defined by the formula in the range of 10 to 1,000 nm and a retardation value along the thickness defined by the formula in the range of 10 to 1,000 nm.

The invention further provides a liquid crystal display comprising a liquid crystal cell of VA mode and two polarizing elements placed on both sides of the cell, wherein at least one of the polarizing elements comprises a transparent protective film, a polarizing membrane, and an optical compensatory sheet having a transparent support and an optically anisotropic layer formed from liquid crystal molecules aligned in an average inclined angle of less than 5°, said optical compensatory sheet having a retardation value in plane defined by the formula in the range of 10 to 1,000 nm and a retardation value along the thickness defined by the formula in the range of 10 to 1,000 nm.

The inventors have studied and finally found that correct optical compensation for the liquid crystal cell comprising many essentially vertically aligned rod-like liquid crystal molecules can be realized by an optical compensatory sheet which has a transparent support and an optically anisotropic layer formed from liquid crystal molecules aligned in an average inclined angle of less than 5° and which has a retardation value in plane in the range of 10 to 1,000 nm and a retardation value along the thickness direction in the range of 10 to 1,000 nm.

When a conventional optical compensatory sheet optically compensates the liquid crystal cell comprising many essentially vertically aligned rod-like liquid crystal molecules, the compensation is given by only alignment of the discotic liquid crystal molecules. However, only discotic liquid crystal molecules cannot fully optically compensate the liquid crystal cell although discotic liquid crystal molecules can be oriented in various alignment forms. In the present invention, the liquid crystal cell comprising many essentially vertically aligned rod-like liquid crystal molecules can be optically compensated correctly by a combination of the discotic liquid crystal molecules and optical anisotropy of the transparent support (first embodiment of the invention), by rod-like liquid crystal molecules (second embodiment of the invention), or by a combination of the discotic liquid crystal molecules and rod-like liquid crystal molecules (third embodiment of the invention).

In addition to the liquid crystal cell, the polarizing membrane also has an optical characteristic about a viewing angle. According to the study of the inventors, an optically uniaxial or biaxial (preferably, biaxial) transparent support can optically compensate the polarizing membrane effectively.

EMBODIMENTS OF THE INVENTION (Basic Structure of Liquid Crystal Display)

Figure 1:
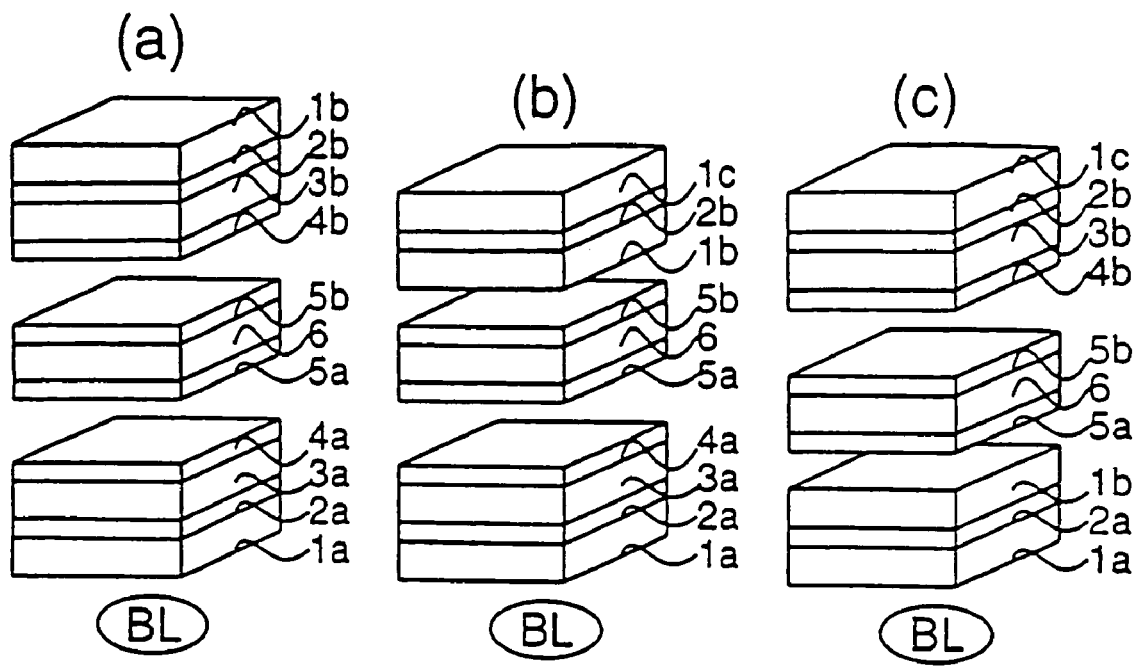
FIG. 1 is a view schematically illustrating basic construction of liquid crystal displays of transmission type.

FIG. 1 is a view schematically illustrating a basic structure of liquid crystal displays of transmission type.

The display shown in FIG. 1(a) comprises a transparent protective film (1a), a polarizing membrane (2a), a transparent support (3a), an optically anisotropic layer (4a), a lower substrate of liquid crystal cell (5a), rod-like liquid crystal molecules (6), an upper substrate of liquid crystal cell (5b), an optically anisotropic layer (4b), a transparent support (3b), a polarizing membrane (2b) and a transparent protective film (1b), piled up in this order from the side of a back light (BL).

Each combination of the transparent support and the optically anisotropic layer (3a-4a and 4b-3b) constitutes an optical compensatory sheet. Each combination of the transparent protective film, the polarizing membrane, the transparent support and the optically anisotropic layer (1a-4a and 4b-1b) constitutes an elliptically polarizing plate.

The display shown in FIG. 1(b) comprises a transparent protective film (1a), a polarizing membrane (2a), a transparent support (3a), an optically anisotropic layer (4a), a lower substrate of liquid crystal cell (5a), rod-like liquid crystal molecules (6), an upper substrate of liquid crystal cell (5b), a transparent protective film (1b), a polarizing membrane (2b) and a transparent protective film (1c), piled up in this order from the side of a back light (BL).

A combination of the transparent support and the optically anisotropic layer (3a-4a) constitutes an optical compensatory sheet. A combination of the transparent protective film, the polarizing membrane, the transparent support and the optically anisotropic layer (1a-4a) constitutes an elliptically polarizing plate.

The display shown in FIG. 1(c) comprises a transparent protective film (1a), a polarizing membrane (2a), a transparent protective film (1b), a lower substrate of liquid crystal cell (5a), rod-like liquid crystal molecules (6), an upper substrate of liquid crystal cell (5b), an optically anisotropic layer (4b), a transparent support (3b), a polarizing membrane (2b) and a transparent protective film (1c), piled up in this order from the side of a back light (BL).

A combination of the transparent support and the optically anisotropic layer (4b-3b) constitutes an optical compensatory sheet. A combination of the transparent protective film, the polarizing membrane, the transparent support and the optically anisotropic layer (4b-1c) constitutes an elliptically polarizing plate.

Figure 2:
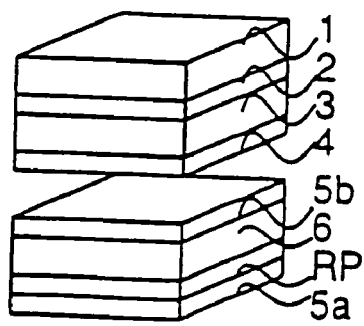
FIG. 2 is a view schematically illustrating basic construction of a liquid crystal display of reflection type

FIG. 2 is a view schematically illustrating basic construction of a liquid crystal display of reflection type.

The display shown in FIG. 2 comprises a lower substrate of liquid crystal cell (5a), a reflection plate (RP), rod-like liquid crystal molecules (6), an upper substrate of liquid crystal cell (5b), an optically anisotropic layer (4), a transparent support (3), a polarizing membrane (2) and a transparent protective film (1), piled up in this order.

A combination of the transparent support and the optically anisotropic layer (4-3) constitutes an optical compensatory sheet. A combination of the transparent protective film, the polarizing membrane, the transparent support and the optically anisotropic layer (4-1) constitutes an elliptically polarizing plate.

In each display shown in FIG. 1 and FIG. 2, the order of the optically anisotropic layer (4) and the transparent support (3) is reversible.

Besides the optical compensatory sheet or the elliptically polarizing plate in each display, a second optically anisotropic layer can be provided. In that case, there is no particular restriction on the position of the second optically anisotropic layer. Therefore, the second optically anisotropic layer may be positioned at A, B or C in the layering order of (polarizing membrane)-A-transparent support-B-optically anisotropic layer-C-(liquid crystal cell).

[Optically Anisotropic Layer]

The optically anisotropic layer is formed from liquid crystal molecules, which are preferably discotic liquid crystal molecules, rod-like liquid crystal molecules or mixture thereof.

The liquid crystal molecules are aligned in an average inclined angle of less than 5°. The 'inclined angle' of discotic liquid crystal molecule means an angle between the discotic plane of the molecule and the surface of the transparent support, while the 'inclined angle' of rod-like liquid crystal molecule means an angle between the long axis of the molecule and the surface of the transparent support.

In the first embodiment of the invention, an optically anisotropic layer comprising discotic liquid crystal molecules aligned in an average inclined angle of less than 5° is used in combination with an optically uniaxial or biaxial transparent support.

In the second embodiment of the invention, an optically anisotropic layer comprising discotic liquid crystal molecules aligned in an average inclined angle of less than 5° is used in combination with a second optically anisotropic layer comprising rod-like liquid crystal molecules aligned in an average inclined angle of less than 5°. Otherwise, an optically anisotropic layer in which both discotic liquid crystal molecules and rod-like liquid crystal molecules are aligned in average inclined angles of less than 5° is used.

The optically anisotropic layer(s) of the second embodiment may be used in combination with an optically uniaxial or biaxial transparent support. If so, the total retardation of the optical compensatory sheet can be adjusted by the optically uniaxial or biaxial transparent support. The optically uniaxial or biaxial transparent support is described in detail below.

In the second embodiment, it is preferred that lines obtained by projecting the long axes of rod-like liquid crystal molecules onto the (optically uniaxial or biaxial) transparent support be on average essentially parallel or perpendicular to the slow axis in plane of the support.

The optically anisotropic layer and the second optically anisotropic layer can be placed on the same side of the transparent support. Otherwise, the transparent support may be placed between them. In that case, the second optically anisotropic layer, the transparent support and the optically anisotropic layer are piled up in this order.

In the third embodiment of the invention, an optically anisotropic layer comprising rod-like liquid crystal molecules aligned in an average inclined angle of less than 5° is used.

The optically anisotropic layer of the third embodiment may be used in combination with an optically uniaxial or biaxial transparent support. If so, the total retardation of the optical compensatory sheet can be adjusted by the optically uniaxial or biaxial transparent support. The optically uniaxial or biaxial transparent support is described in detail below.

The second optically anisotropic layer may be provided in the optical compensatory sheet of the third embodiment. The retardation in plane (Re) can be effectively adjusted by a combination of the optically anisotropic layer and the second optically anisotropic layer. Further, in order to control the wavelength dispersion of retardation, the second optically anisotropic layer can be provided. The second optically anisotropic layer in the third embodiment is also preferably formed from rod-like liquid crystal molecules, which are further preferably aligned in an average inclined angle of less than 5°.

It is preferred that lines obtained by projecting the long axes of rod-like liquid crystal molecules in the optically anisotropic layer onto the transparent support be on average essentially perpendicular to lines obtained by projecting the long axes of rod-like liquid crystal molecules in the second optically anisotropic layer onto the transparent support. Further, the former lines can be crossed with the latter lines at an angle of 5° to 85° on average.

It is also preferred that lines obtained by projecting the long axes of rod-like liquid crystal molecules in the optically anisotropic layer onto the transparent support (having an optically uniaxial birefringence or an optically biaxial birefringence) be on average essentially parallel or perpendicular to the slow axis in plane of the support.

The optically anisotropic layer and the second optically anisotropic layer can be placed on the same side of the transparent support. Otherwise, the transparent support may be placed between them. In that case, the second optically anisotropic layer, the transparent support and the optically anisotropic layer are piled up in this order.

The term "essentially parallel" or "essentially perpendicular" in the present specification means an angle between noticed directions in the range of 0°(180°)±10° or 90°±10°, respectively. This angle allowance is preferably less than ±8°, more preferably less than ±6°, further preferably less than ±4°, furthermore preferably less than ±2°, and most preferably less than ±1°.

The total retardation of the optical compensatory sheet is preferably adjusted by the optical anisotropy of the optically anisotropic layer, that of the second optically anisotropic layer or that of the transparent support.

With respect to the total retardation of the optical compensatory sheet, a retardation value in plane (Re) is in the range of 10 to 1,000 nm, preferably in the range of 20 to 200 nm, more preferably in the range of 20 to 100 nm, and most preferably in the range of 20 to 70 nm. A retardation value along the thickness direction (Rth) is in the range of 10 to 1,000 nm, preferably in the range of 70 to 500 nm, more preferably in the range of 70 to 300 nm, and most preferably in the range of 70 to 200 nm.

The Re and Rth retardation values are defined by the following formulas:

$$Re=(nx-ny)\times d$$

$$Rth=[\{(nx+ny)/2\}-nz]\times d$$

in which each of nx and ny is a refractive index in the plane of the optical compensatory sheet; nz is a refractive index along the thickness direction of the optical compensatory sheet; and d is the thickness of the optical compensatory sheet.

The discotic liquid crystal molecules are described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecules is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) preferably is a compound represented by the following formula (I):

$$D(\text{-}L\text{-}Q)_n \qquad (I)$$

in which D is a discotic core; L is a divalent linking group; Q is a polymerizable group; and n is an integer of 4 to 12.
Examples of the discotic cores (D) are shown below. In the examples, LQ (or QL) means the combination of the divalent linking group (L) and the polymerizable group (O).
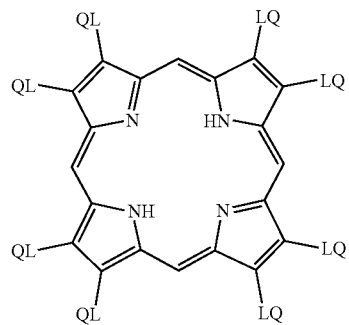
(D1)
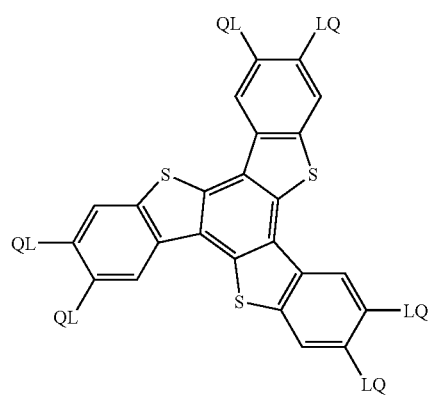
(D2)
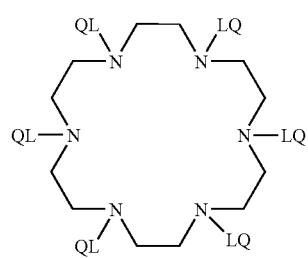
(D3)
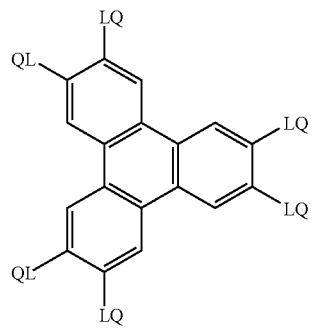
(D4)
-continued
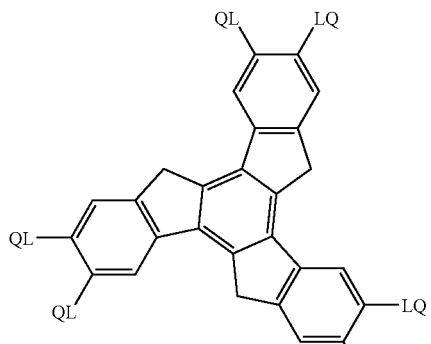
(D5)
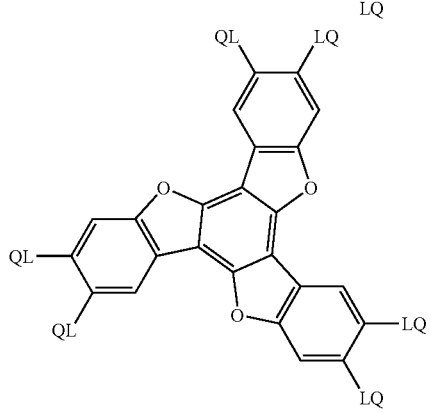
(D6)
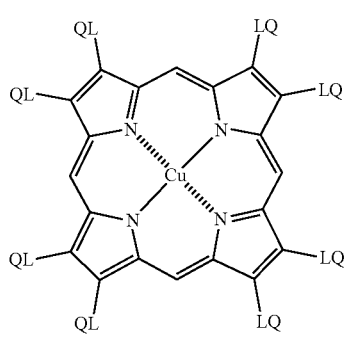
(D7)
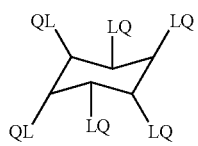
(D8)
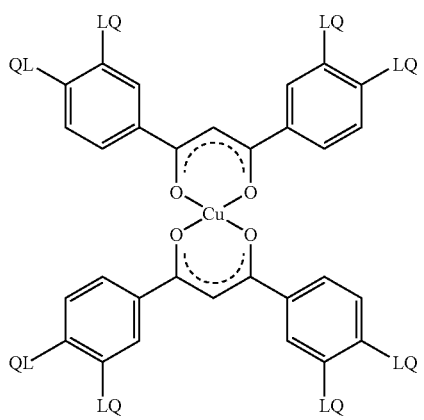
(D9)

-continued

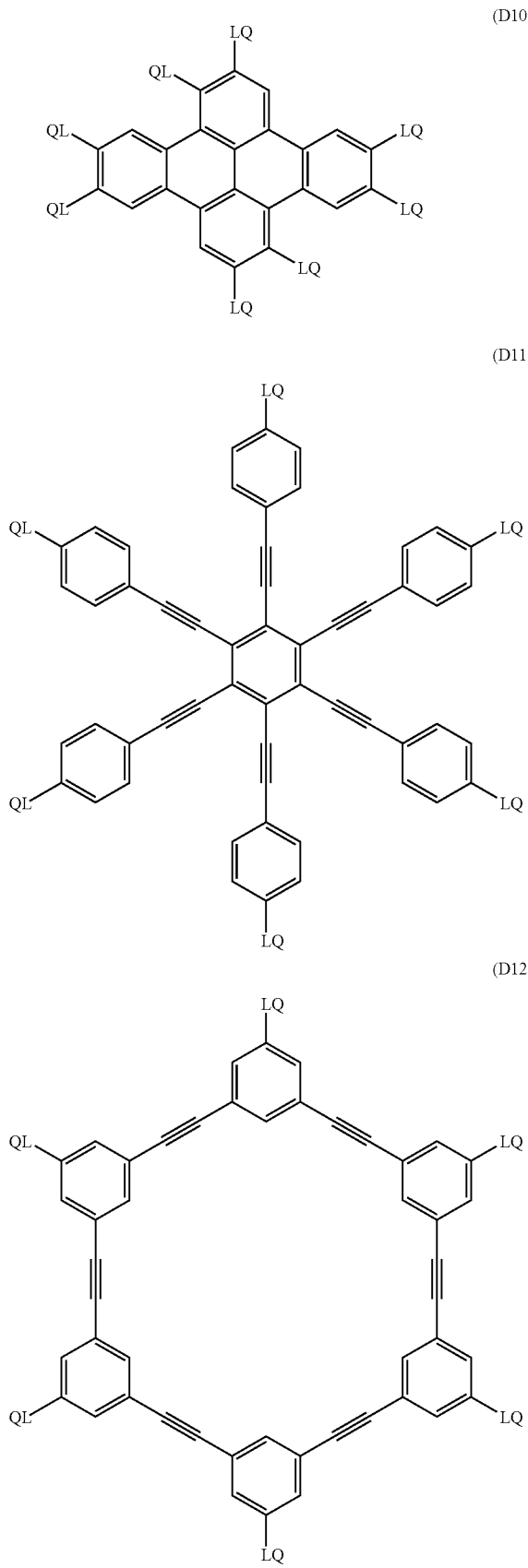

(D10)

(D11)

(D12)

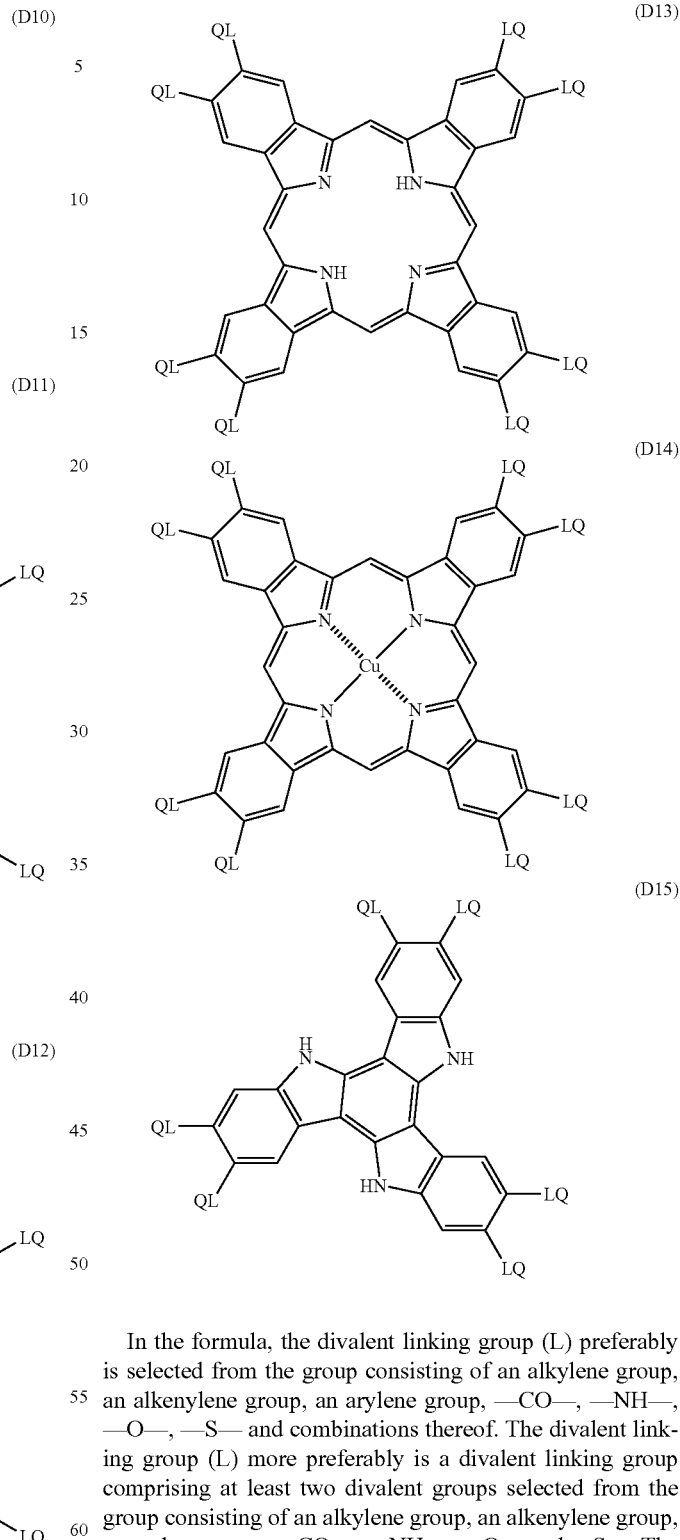

(D13)

(D14)

(D15)

In the formula, the divalent linking group (L) preferably is selected from the group consisting of an alkylene group, an alkenylene group, an arylene group, —CO—, —NH—, —O—, —S— and combinations thereof. The divalent linking group (L) more preferably is a divalent linking group comprising at least two divalent groups selected from the group consisting of an alkylene group, an alkenylene group, an arylene group, —CO—, —NH—, —O— and —S—. The divalent linking group (L) further preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (O). The AL means an alkylene group or an alkenylene group. The AR means an arylene group.

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AL-AR-O-AL-O—CO—
L17: —O—CO-AR-O-AL-CO—
L18: —O—CO-AR-O-AL-O—CO—
L19: —O—CO-AR-O-AL-O-AL-O—CO—
L20: —O—CO-AR-O-AL-O-AL-O-AL-O—CO—
L21: —S-AL-
L22: —S-AL-O—
L23: —S-AL-O—CO—
L24: —S-AL-S-AL-
L25: —S-AR-AL-

The polymerizable group (O) in the formula (I) is determined according to the polymerization reaction. Examples of the polymerizable groups (O) are shown below.

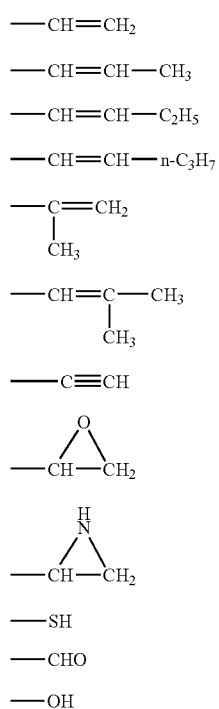

(Q1) —CH=CH$_2$
(Q2) —CH=CH—CH$_3$
(Q3) —CH=CH—C$_2$H$_5$
(Q4) —CH=CH—n-C$_3$H$_7$
(Q5) —C(CH$_3$)=CH$_2$
(Q6) —CH=C(CH$_3$)—CH$_3$
(Q7) —C≡CH
(Q8) epoxy
(Q9) aziridinyl
(Q10) —SH
(Q11) —CHO
(Q12) —OH -continued
(Q13) —CO$_2$H
(Q14) —N=C=O
(Q15) —NH$_2$
(Q16) —SO$_3$H
(Q17) —N=C=S The polymerizable group (O) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula (I), n is an integer of 4 to 12, which is determined according to the chemical structure of the discotic core (D). The 4 to 12 combinations of L and Q can be different from each other. However, the combinations are preferably identical.

Two or more kinds of the discotic liquid crystal molecules can be used in combination. For example, the molecules having a polymerizable group (O) can be used in combination with those having no polymerizable group.

The discotic liquid crystal molecule having no polymerizable group (non-polymerizable discotic liquid crystal molecule) is preferably a molecule in which hydrogen atom or an alkyl group is introduced into the above-described polymerizable discotic liquid crystal molecule in place of the polymerizable group. Namely, the non-polymerizable discotic liquid crystal molecule is preferably represented by the following formula (Ia):

$$D(\text{-L-R})_n \qquad (Ia)$$

in which D is a discotic core; L is a divalent linking group; R is hydrogen atom or an alkyl group; and n is an integer of 4 to 12.

Examples of the discotic cores (D) in the formula (Ia) are the same as those in the above-described polymerizable discotic liquid crystal molecule except that LQ (or QL) is replaced with LR (or RL).

Examples of the divalent linking groups (L) in the formula (Ia) are also the same as those in the above-described polymerizable discotic liquid crystal molecule.

The alkyl group R has preferably 1 to 40 carbon atoms, more preferably 1 to 30 carbon atoms. A chain alkyl group is preferred to a cyclic one, and further a straight chain alkyl group is preferred to a branched one. The R in the formula (Ia) is particularly preferably hydrogen atom or a straight chain alkyl group having 1 to 30 carbon atoms.

In order to align the discotic liquid crystal molecules so that an average angle between the discotic plane of each molecule and the surface of the transparent support (namely, an average inclined angle) may be less than 5°, it is preferred to use, in an amount of a certain range, a compound which can cause phase separation with the discotic liquid crystal molecules. Examples of the compound that can cause phase separation with the discotic liquid crystal molecules include fluorine-containing surface active agents and compounds having 1,3,5-triazine ring.

A fluorine-containing surface active agent comprises a fluorine-containing hydrophobic group, a nonionic, anionic, cationic or amphoteric hydrophilic group, and an optional linking group.

A fluorine-containing surface active agent comprising one hydrophobic group and one hydrophilic group is represented by the following formula (II):

$$Rf\text{-}L^3\text{-}Hy \quad (II)$$

in which Rf is a monovalent hydrocarbon residue substituted with fluorine atom, $L^3$ is a single bond or a divalent linking group, and Hy is a hydrophilic group.

In the formula (II), Rf serves as a hydrophobic group. The hydrocarbon residue is preferably an alkyl group or an aryl group. The alkyl group preferably has 3 to 30 carbon atoms, and the aryl group preferably has 6 to 30 carbon atoms.

The hydrogen atoms of the hydrocarbon residue are partially or fully substituted with fluorine atoms. The ratio of hydrogen atoms substituted with fluorine atoms is preferably in the range of not less than 50%, more preferably in the range of not less than 60%, further preferably in the range of not less than 70%, and most preferably in the range of not less than 80%.

The remaining hydrogen atoms (not substituted with fluorine atoms) may be further substituted with other halogen atoms (e.g., chlorine, bromine).

Examples of Rf are shown below.
Rf1: n-$C_8H_{17}$—
Rf2: n-$C_6H_{13}$—
Rf3: Cl—$(CF_2$—$CFCl)_3$—$CF_2$—
Rf4: H—$(CF_2)_8$—
Rf5: H—$(CF_2)_{10}$—
Rf6: n-$C_9H_{19}$—
Rf7: pentafluorophenyl
Rf8: n-$C_7H_{15}$—
Rf9: Cl—$(CF_2$—$CFCl)_2$—$CF_2$—
Rf10: H—$(CF_2)_4$—
Rf11: H—$(CF_2)_6$—
Rf12: Cl—$(CF_2)_6$—
Rf13: $C_3F_7$—

In the formula (II), the divalent linking group is preferably a divalent linking group selected from the group consisting of an alkylene group, an arylene group, a divalent heterocyclic residue, —CO—, —NR— (in which R is an alkyl group having 1 to 5 or hydrogen), —O—, —$SO_2$— and a combination thereof.

Examples of $L^3$ are shown below. In the examples, the left side is attached to the hydrophobic group (Rf), and the right side is attached to the hydrophilic group (Hy). The AL means an alkylene group, the AR means an arylene group, and the Hc means a divalent heterocyclic residue. The alkylene group, the arylene group and the divalent heterocyclic residue may have substituent groups (e.g., alkyl group).
L0: single bond
L31: —$SO_2$—NR—
L32: -AL-O—
L33: —CO—NR—
L34: -AR-O—
L35: —$SO_2$—NR-AL-CO—O—
L36: —CO—O—
L37: —$SO_2$—NR-AL-O—
L38: —$SO_2$—NR-AL-
L39: —CO—NR-AL-
L40: -$AL^1$-O-$AL^2$-
L41: -Hc-AL-
L42: —$SO_2$—NR-$AL^1$-O-$AL^2$-
L43: -AR-
L44: —O-AR-$SO_2$—NR-AL-
L45: —O-AR-$SO_2$—NR—
L46: —O-AR-O—

In the formula (II), Hy is a nonionic hydrophilic group, an anionic hydrophilic group, a cationic hydrophilic group or a combination thereof (namely, amphoteric hydrophilic group). A nonionic hydrophilic group is particularly preferred.

Examples of Hy in the formula (II) are shown below.
Hy1: —$(CH_2CH_2O)_n$—H (n is an integer of 5 to 30)
Hy2: —$(CH_2CH_2O)_n$—$R^1$ (n is an integer of 5 to 30, and $R^1$ is an alkyl group having 1 to 6 carbon atom)
Hy3: —$(CH_2CHOHCH_2)_n$—H (n is an integer of 5 to 30)
Hy4: —COOM (M is hydrogen, an alkali metal atom or dissociated)
Hy5: —$SO_3$M (M is hydrogen, an alkali metal atom or dissociated)
Hy6: —$(CH_2CH_2O)_n$—$CH_2CH_2CH_2$—$SO_3$M (n is an integer of 5 to 30, and M is hydrogen or an alkali metal atom)
Hy7: —OPO$(OH)_2$
Hy8: —$N^+(CH_3)_3.X^-$ (X is a halogen atom)
Hy9: —COONH$_4$ Nonionic hydrophilic groups (Hy1, Hy2, Hy3) are preferred, and a hydrophilic group of polyethylene oxide (Hy1) is most preferred.

Concrete examples of the fluorine-containing surface active agent represented by the formula (II) are shown below. Each example is represented by a combination of the above Rf, $L^3$ and Hy.
FS-1: Rf1-L31(R is $C_3H_7$)-Hy1(n=6)
FS-2: Rf1-L31(R is $C_3H_7$)-Hy1(n=11)
FS-3: Rf1-L31(R is $C_3H_7$)-Hy1(n=16)
FS-4: Rf1-L31(R is $C_3H_7$)-Hy1(n=21)
FS-5: Rf1-L31(R is $C_2H_5$)-Hy1(n=6)
FS-6: Rf1-L31(R is $C_2H_5$)-Hy1(n=11)
FS-7: Rf1-L31(R is $C_2H_5$)-Hy1(n=16)
FS-8: Rf1-L31(R is $C_2H_5$)-Hy1(n=21)
FS-9: Rf2-L31(R is $C_3H_7$)-Hy1(n=6)
FS-10: Rf2-L31(R is $C_3H_7$)-Hy1(n=11)
FS-11: Rf2-L31(R is $C_3H_7$)-Hy1(n=16)
FS-12: Rf2-L31(R is $C_3H_7$)-Hy1(n=21)
FS-13: Rf3-L32(AL is $CH_2$)-Hy1(n=5)
FS-14: Rf3-L32(AL is $CH_2$)-Hy1(n=10)
FS-15: Rf3-L32(AL is $CH_2$)-Hy1(n=15)
FS-16: Rf3-L32(AL is $CH_2$)-Hy1(n=20)
FS-17: Rf4-L33(R is $C_3H_7$)-Hy1(n=7)
FS-18: Rf4-L33(R is $C_3H_7$)-Hy1(n=13)
FS-19: Rf4-L33(R is $C_3H_7$)-Hy1(n=19)
FS-20: Rf4-L33(R is $C_3H_7$)-Hy1(n=25)
FS-21: Rf5-L32(AL is $CH_2$)-Hy1(n=11)
FS-22: Rf5-L32(AL is $CH_2$)-Hy1(n=15)
FS-23: Rf5-L32(AL is $CH_2$)-Hy1(n=20)
FS-24: Rf5-L32(AL is $CH_2$)-Hy1(n=30)
FS-25: Rf6-L34(AR is p-phenylene)-Hy1(n=11)
FS-26: Rf6-L34(AR is p-phenylene)-Hy1(n=17)
FS-27: Rf6-L34(AR is p-phenylene)-Hy1(n=23)
FS-28: Rf6-L34(AR is p-phenylene)-Hy1(n=29)
FS-29: Rf1-L35(R is $C_3H_7$, AL is $CH_2$)-Hy1(n=20)
FS-30: Rf1-L35(R is $C_3H_7$, AL is $CH_2$)-Hy1(n=30)
FS-31: Rf1-L35(R is $C_3H_7$, AL is $CH_2$)-Hy1(n=40)
FS-32: Rf1-L36-Hy1(n=5)
FS-33: Rf1-L36-Hy1(n=10)
FS-34: Rf1-L36-Hy1(n=15)
FS-35: Rf1-L36-Hy1(n=20)
FS-36: Rf7-L36-Hy1(n=8)
FS-37: Rf7-L36-Hy1(n=13)
FS-38: Rf7-L36-Hy1(n=18)
FS-39: Rf7-L36-Hy1(n=25)
FS-40: Rf1-L0-Hy1(n=6)

FS-41: Rf1-L0-Hy1(n=11)
FS-42: Rf1-L0-Hy1(n=16)
FS-43: Rf1-L0-Hy1(n=21)
FS-44: Rf1-L31(R is $C_3H_7$)-Hy2(n=7, $R^1$ is $C_2H_5$)
FS-45: Rf1-L31(R is $C_3H_7$)-Hy2(n=13, $R^1$ is $C_2H_5$)
FS-46: Rf1-L31(R is $C_3H_7$)-Hy2(n=20, $R^1$ is $C_2H_5$)
FS-47: Rf1-L31(R is $C_3H_7$)-Hy2(n=28, $R^1$ is $C_2H_5$)
FS-48: Rf8-L32(AL is $CH_2$)-Hy1(n=5)
FS-49: Rf8-L32(AL is $CH_2$)-Hy1(n=10)
FS-50: Rf8-L32(AL is $CH_2$)-Hy1(n=15)
FS-51: Rf8-L32(AL is $CH_2$)-Hy1(n=20)
FS-52: Rf1-L37(R is $C_3H_7$, AL is $CH_2CH_2$)-Hy3(n=5)
FS-53: Rf1-L37(R is $C_3H_7$, AL is $CH_2CH_2$)-Hy3(n=7)
FS-54: Rf1-L37(R is $C_3H_7$, AL is $CH_2CH_2$)-Hy3(n=9)
FS-55: Rf1-L37(R is $C_3H_7$, AL is $CH_2CH_2$)-Hy3(n=12)
FS-56: Rf9-L0-Hy4(M is H)
FS-57: Rf3-L0-Hy4(M is H)
FS-58: Rf1-L38(R is $C_3H_7$, AL is $CH_2$)-Hy4(M is K)
FS-59: Rf4-L39(R is $C_3H_7$, AL is $CH_2$)-Hy4(M is Na)
FS-60: Rf1-L0-Hy5(M is K)
FS-61: Rf10-L40 ($AL^1$ is $CH_2$, $AL^2$ is $CH_2CH_2$)-Hy5(M is Na)
FS-62: Rf11-L40 ($AL^1$ is $CH_2$, $AL^2$ is $CH_2CH_2$)-Hy5(M is Na)
FS-63: Rf5-L40 ($AL^1$ is $CH_2$, $AL^2$ is $CH_2CH_2$)-Hy5(M is Na)
FS-64: Rf1-L38 (R is $C_3H_7$, AL is $CH_2CH_2CH_2$)-Hy5(M is Na)
FS-65: Rf1-L31(R is $C_3H_7$)-Hy6(n=5, M is Na)
FS-66: Rf1-L31(R is $C_3H_7$)-Hy6(n=10, M is Na)
FS-67: Rf1-L31(R is $C_3H_7$)-Hy6(n=15, M is Na)
FS-68: Rf1-L31(R is $C_3H_7$)-Hy6(n=20, M is Na)
FS-69: Rf1-L38 (R is $C_2H_5$, AL is $CH_2CH_2$)-Hy7
FS-70: Rf1-L38 (R is H, AL is $CH_2CH_2CH_2$)-Hy8 (X is I)
FS-71: Rf11-L41(Hc shown below, AL is $CH_2CH_2CH_2$)-Hy6(M is dissociated)

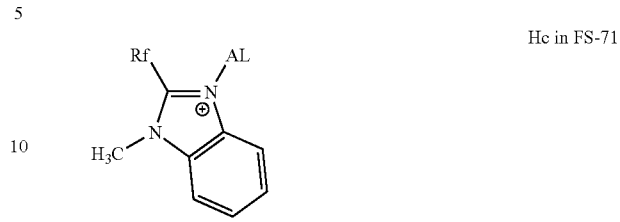

Hc in FS-71

FS-72: Rf1-L42(R is $C_3H_7$, $AL^1$ is $CH_2CH_2$, $AL^2$ is $CH_2CH_2CH_2$)-Hy6(M is Na)
FS-73: Rf12-L0-Hy5 (M is Na)
FS-74: Rf13-L43(AR is o-phenylene)-Hy6(M is K)
FS-75: Rf13-L43(AR is m-phenylene)-Hy6(M is K)
FS-76: Rf13-L43(AR is p-phenylene)-Hy6(M is K)
FS-77: Rf6-L44(R is $C_2H_5$, AL is $CH_2CH_2$)-Hy5(M is H)
FS-78: Rf6-L45(AR is p-phenylene, R is $C_2H_5$)-Hy1(n=9)
FS-79: Rf6-L45(AR is p-phenylene, R is $C_2H_5$)-Hy1(n=14)
FS-80: Rf6-L45(AR is p-phenylene, R is $C_2H_5$)-Hy1(n=19)
FS-81: Rf6-L45(AR is p-phenylene, R is $C_2H_5$)-Hy1(n=28)
FS-82: Rf6-L46(AR is p-phenylene)-Hy1(n=5)
FS-83: Rf6-L46(AR is p-phenylene)-Hy1(n=10)
FS-84: Rf6-L46(AR is p-phenylene)-Hy1(n=15)
FS-85: Rf6-L46(AR is p-phenylene)-Hy1(n=20)

A fluorine-containing surface active agent having two or more fluorine-containing hydrophobic or hydrophilic groups may be used. Examples of such surface active agent are shown below.

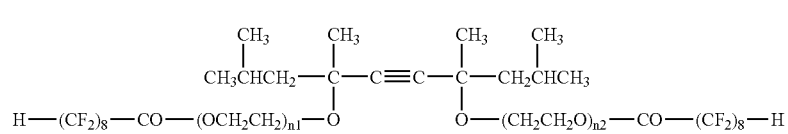

(FS-86 to FS-88)

FS-86: n1 + n2 = 12
FS-87: n1 + n2 = 18
FS-88: n1 + n2 = 24

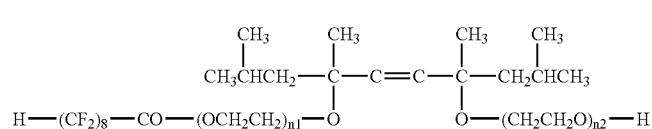

(FS-89 to FS-91)

FS-89: n1 + n2 = 20
FS-90: n1 + n2 = 30
FS-91: n1 + n2 = 40

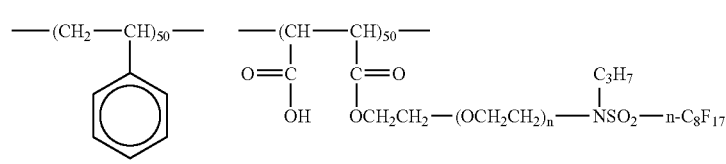

(FS-92 to FS-95)

FS-92: n = 5
FS-93: n = 10
FS-94: n = 15
FS-95: n = 20

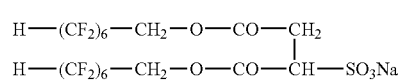

(FS-96)

Two or more fluorine-containing surface active agents may be used in combination.

Surface active agents are described in various publications (e.g., Hiroshi Horiguchi, "New Surface Active Agents (written in Japanese)", Sankyo Shuppan Co., 1975; M. J. Schick, "Nonionic Surfactants", Marcell Dekker Inc., New York (1967); Japanese Patent Provisional Publication No. 7(1995)-13293).

The fluorine-containing surface active agent is used preferably in an amount of 2 to 30 wt. %, more preferably in an amount of 3 to 25 wt. %, most preferably in an amount of 5 to 10 wt. % based on the amount of the discotic liquid crystal compound.

The fluorine-containing surface active agent is applied preferably in an amount of 25 to 1,000 mg/m², more preferably in an amount of 30 to 500 mg/m², most preferably in an amount of 35 to 200 mg/m².

The compound having 1,3,5-triazine ring is preferably represented by the formula (III):

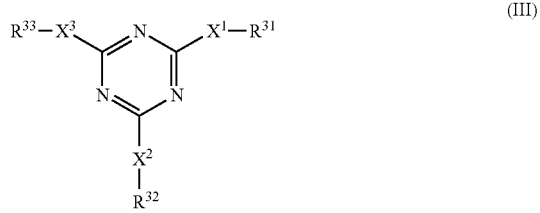

in which each of $X^1$, $X^2$ and $X^3$ is independently a single bond, —NR— (R is an alkyl group having 1 to 30 carbon atoms or a hydrogen atom), —O— or —S—; and each of $R^{31}$, $R^{32}$ and $R^{33}$ is independently an alkyl group, an alkenyl group, an aryl group and a heterocyclic group.

The compound represented by the formula (III) is preferably a melamine compound. In the melamine compound, $X^1$, $X^2$ or $X^3$ in the formula (III) is —NR—. Otherwise, $X^1$, $X^2$ or $X^3$ is a single bond and $R^{31}$, $R^{32}$ and $R^{33}$ are heterocyclic groups in each of which a nitrogen atom has a dissociated valence. The melamine compound is described in detail below as a compound of the formula (IV).

The R in —NR— is preferably a hydrogen atom.

Each of $R^{31}$, $R^{32}$ and $R^{33}$ is preferably an aryl group.

An alkyl group of a chain structure is preferred to a cyclic alkyl group. An alkyl group of a straight chain is preferred to a branched alkyl group. The alkyl group has preferably 1 to 30 carbon atoms, more preferably 2 to 30 carbon atoms, further preferably 4 to 30 carbon atoms, and most preferably 6 to 30 carbon atoms. The alkyl group may have a substituent group. Examples of the substituent groups include a halogen atom, an alkoxy group (e.g., methoxy, ethoxy, epoxyethyloxy) and an acyloxy group (e.g., acryloyloxy, methacryloyloxy).

An alkenyl group of a chain structure is preferred to a cyclic alkenyl group. An alkenyl group of a straight chain is preferred to a branched alkenyl group. The alkenyl group has preferably 2 to 30 carbon atoms, more preferably 3 to 30 carbon atoms, further preferably 4 to 30 carbon atoms, and most preferably 6 to 30 carbon atoms. The alkenyl group may have a substituent group. Examples of the substituent group include a halogen atom, an alkoxy group (e.g., methoxy, ethoxy, epoxyethyloxy) and an acyloxy group (e.g., acryloyloxy, methacryloyloxy).

The above aryl group is preferably phenyl or naphthyl, particularly preferably phenyl.

The aryl group can have a substituent group. Examples of the substituent group include a halogen atom, hydroxyl cyano, nitro, carboxyl, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, sulfamoyl, an alkyl-substituted sulfamoyl group, an alkenyl-substituted sulfamoyl group, an aryl-substituted sulfamoyl group, a sulfonamido group, carbamoyl, an alkyl-substituted carbamoyl group, an alkenyl-substituted carbamoyl group, an aryl-substituted carbamoyl group, an amido group, an alkylthio group, an alkenylthio group, an arylthio group and an acyl group.

The alkyl group described above. Also the description of the alkyl group can be applied for the alkyl moieties of the alkoxy group, the acyloxy group, the alkoxycarbonyl group, the alkyl-substituted sulfamoyl group, the sulfonamido group, the alkyl-substituted carbamoyl group, the amido group, the alkylthio group and the acyl group.

The alkenyl group is described above. Also the description of the alkenyl group can be applied for the alkenyl moieties of the alkenyloxy group, the acyloxy group, the alkenyloxycarbonyl group, the alkenyl-substituted sulfamoyl group, the amido group, the alkenylthio group and the acyl group.

Examples of the aryl group include phenyl, α-naphthyl, β-naphthyl, 4-methoxyphenyl, 3,4-diethoxyphenyl, 4-octyloxyphenyl and 4-dodecyloxyphenyl. These examples can be applied for the aryl moieties of the acyloxy group, the acyloxy group, the aryloxycarbonyl group, the aryl-substituted sulfamoyl group, the sulfonamido group, the aryl-substituted carbamoyl group, the amido group, the arylthio group and the acyl group.

In the case that $X^1$, $X^2$ or $X^3$ is —NR—, —O— or —S—, the heterocyclic group is preferably aromatic. The aromatic heterocyclic ring is generally unsaturated, and preferably has double bonds as many as possible. The aromatic heterocyclic ring is preferably 5-, 6- or 7-membered (more preferably 5- or 6-membered, most preferably 6-membered). Preferred hetero-atoms are nitrogen, oxygen and sulfur. Nitrogen atom is particularly preferred. As the aromatic heterocyclic ring, pyridine ring is particularly preferred (2-pyridyl or 4-pyridyl is particularly preferred as the heterocyclic group). The heterocyclic ring may have a substituent group. Examples of the substituent group are the same as those for the aryl group described above.

In the case that $X^1$, $X^2$ or $X^3$ is a single bond, the heterocyclic group is preferably a heterocyclic group in which a nitrogen atom has a dissociated valence. The heterocyolic group is preferably 5-, 6- or 7-membered (more preferably 5- or 6-membered, most preferably 5-membered). The heterocyclic group may have two or more nitrogen atoms, and also may have a hetero-atom (e.g., O, S) other than nitrogen. The heterocyclic group may have a substituent group. Examples of the substituent group are the same as those for the aryl group described above.

Examples of the heterocyclic group in which a nitrogen atom has a dissociated valence are shown below.

(Hc-1) 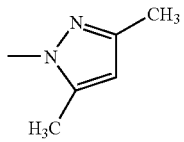

(Hc-2) 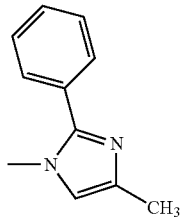

(Hc-3) 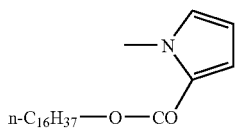

(Hc-4) 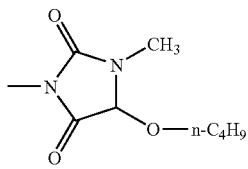

(Hc-5) 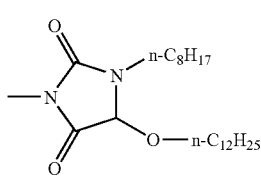

(Hc-6) 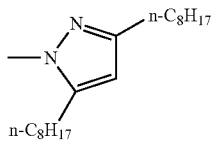

(Hc-7) 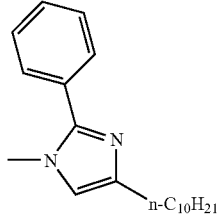

(Hc-8) 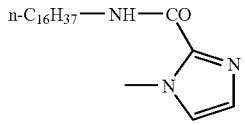

(Hc-9) 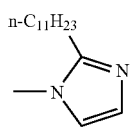

(Hc-10) 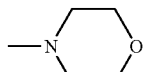

(Hc-11) 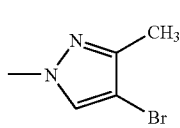

(Hc-12) 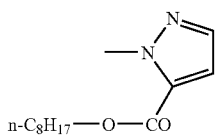

At least one of $R^{31}$, $R^{32}$ and $R^{33}$ preferably has an alkylene or alkenylene moiety having 9 to 30 carbon atoms. The alkylene or alkenylene moiety having 9 to 30 carbon atoms preferably has a straight chain structure. The alkylene or alkenylene moiety is preferably included in the substituent group of the aryl group.

Further, at least one of $R^{31}$, $R^{32}$ and $R^{33}$ preferably has a polymerizable group as a substituent group. The compound having 1,3,5-triazine ring preferably has two or more polymerizable groups. The polymerizable group is preferably placed at the terminal end of $R^{31}$, $R^{32}$ or $R^{33}$.

If the compound having 1,3,5-triazine ring has a polymerizable group, the resultant optically anisotropic layer can contain the discotic liquid crystal molecules polymerized with the compound having 1,3,5-triazine ring.

Hereinafter, $R^{31}$, $R^{32}$ or $R^{33}$ having a polymerizable group as a substituent group is represented by the following formula (Rp):

(Rp)-L$^5$(-Q)$_n$ in which $L^5$ is a (n+1) valent linking group; Q is a polymerizable group; and n is an integer of 1 to 5.

The (n+1) valent linking group ($L^5$) in the formula (Rp) is preferably a combined linking group of at least two groups selected from the group consisting of an alkylene group, an alkenylene group, a (n+1) valent aromatic group, a divalent heterocyclic group, —CO—, —NR— (R is an alkyl group having 1 to 30 carbon atoms or a hydrogen atom), —O—, —S— and —SO$_2$—. The alkylene group preferably has 1 to 12 carbon atoms. The alkenylene group preferably has 2 to 12 carbon atoms. The aromatic group preferably has 6 to 10 carbon atoms.

Examples of $L^5$ in the formula (Rp) are shown below. In the examples, the left side is attached to $X^1$, $X^2$ or $X^3$ (or directly attached to 1,3,5-triazine ring in the case that $X^1$, $X^2$ or $X^3$ is a single bond), and the right side is attached to the polymerizable group (Q). In the examples L53 to L59, each right side (each of n terminal ends) is attached to the polymerizable group (Q). The AL means an alkylene group or an alkenylene group, the Hc means a divalent heterocyclic residue and the AR means an arylene group. The alkylene group, the arylene group and the divalent heterocyclic residue may have substituent groups (e.g., alkyl group, halogen atom).

L51: -AL-O—CO—
L52: -AL-O—
L53: -AR(—O-AL-O—CO—)$_n$
L54: -AR(—O-AL-O—)$_n$
L55: -AR(—O—CO-AL-O—CO—)$_n$

L56: -AR(—CO—O-AL-O—CO—)$_n$
L57: -AR(—O—CO-AR-O-AL-O—CO—)$_n$
L58: -AR(—NR—SO$_2$-AL-O—CO—)$_n$
L59: -AR(—SO$_2$—NR-AL-O—CO—)$_n$

Examples of the polymerizable group (O) in the formula (Rp) are the same as those of the polymerizable groups (Q1 to Q17) for the discotic liquid crystal molecules. The polymerizable group is used to polymerize the compound having 1,3,5-triazine ring with the discotic liquid crystal molecules, and hence the polymerizable group in the compound having 1,3,5-triazine ring is preferably similar to that in the discotic liquid crystal molecule. Therefore, the polymerizable group (Q) in the compound having 1,3,5-triazine ring preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the case that n is 2 or more (2 to 5), the linking group (L$^5$) preferably contains a (n+1) valent aromatic group and more preferably branches at that aromatic group. Preferably, n is an integer of 1 to 3.

Examples of the compound having 1,3,5-triazine ring (except for a melamine compound) are shown below.

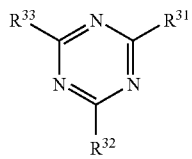

(TR-1 to TR-13)

| | | |
|---|---|---|
| TR-1: | $R^{31}$, $R^{32}$, $R^{33}$: | —(CH$_2$)$_9$—O—CO—CH=CH$_2$ |
| TR-2: | $R^{31}$, $R^{32}$, $R^{33}$: | —(CH$_2$)$_4$—CH=CH—(CH$_2$)$_4$—O—CO—CH=CH$_2$ |
| TR-3: | $R^{31}$, $R^{32}$: | —(CH$_2$)$_9$—O—CO—CH=CH$_2$ |
| | $R^{33}$: | —(CH$_2$)$_{12}$—CH$_3$ |
| TR-4: | $R^{31}$, $R^{32}$: | —(CH$_2$)$_4$—CH=CH—(CH$_2$)$_4$—O—CO—CH=CH$_2$ |
| | $R^{33}$: | —(CH$_2$)$_{12}$—CH$_3$ |
| TR-5: | $R^{31}$: | —(CH$_2$)$_9$—O—CO—CH=CH$_2$ |
| | $R^{32}$, $R^{33}$: | —(CH$_2$)$_{12}$CH$_3$ |
| TR-6: | $R^{31}$: | —(CH$_2$)$_4$—CH=CH—(CH$_2$)$_4$—O—CO—CH=CH$_2$ |
| | $R^{32}$, $R^{33}$: | —(CH$_2$)$_{12}$—CH$_3$ |
| TR-7: | $R^{31}$, $R^{32}$: | —(CH$_2$)$_4$—O—CO—CH=CH$_2$ |
| | $R^{33}$: | —(CH$_2$)$_{12}$—CH$_3$ |
| TR-8: | $R^{31}$: | —(CH$_2$)$_4$—O—CO—CH=CH$_2$ |
| | $R^{32}$, $R^{33}$: | —(CH$_2$)$_{12}$—CH$_3$ |
| TR-9: | $R^{31}$, $R^{32}$, $R^{33}$: | —(CH$_2$)$_9$—O-EpEt |
| TR-10: | $R^{31}$, $R^{32}$, $R^{33}$: | —(CH$_2$)$_4$—CH=CH—(CH$_2$)$_4$—O-EpEt |
| TR-11: | $R^{31}$, $R^{32}$: | —(CH$_2$)$_9$—O-EpEt |
| | $R^{33}$: | —(CH$_2$)$_{12}$—CH$_3$ |
| TR-12: | $R^{31}$, $R^{32}$, $R^{33}$: | —(CH$_2$)$_9$—O—CH=CH$_2$ |
| TR-13: | $R^{31}$, $R^{32}$: | —(CH$_2$)$_9$—O—CH=CH$_2$ |
| | $R^{33}$: | —(CH$_2$)$_{12}$—CH$_3$ |
| (Remark) | EpEt: | epoxyethyl |

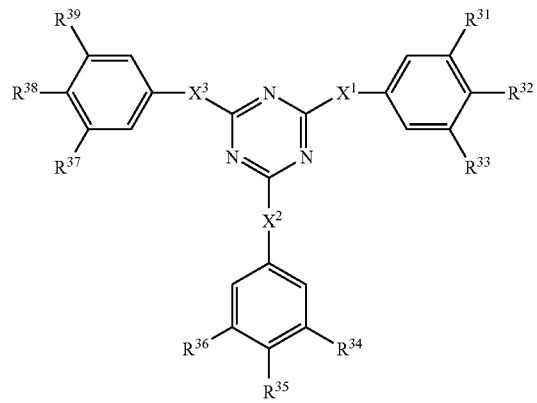

(TR-14 to TR-65)

| | | |
|---|---|---|
| TR-14: | $X^1$, $X^2$, $X^3$: | —O— |
| | $R^{32}$, $R^{35}$, $R^{38}$: | —O—(CH$_2$)$_9$—O—CO—CH=CH$_2$ |
| TR-15: | $X^1$, $X^2$, $X^3$: | —O— |
| | $R^{31}$, $R^{32}$, $R^{34}$, $R^{35}$, $R^{37}$, $R^{38}$: | —O—(CH$_2$)$_9$—O—CO—CH=CH$_2$ |
| TR-16: | $X^1$, $X^2$, $X^3$: | —O— |
| | $R^{32}$, $R^{35}$, $R^{38}$: | —O—(CH$_2$)$_4$—CH=CH—(CH$_2$)$_4$—O—CO—CH=CH$_2$ |
| TR-17: | $X^1$, $X^2$, $X^3$: | —O— |
| | $R^{31}$, $R^{32}$, $R^{34}$, $R^{35}$, $R^{37}$, $R^{38}$: | —O—(CH$_2$)$_4$—CH=CH—(CH$_2$)$_4$—O—CO—CH=CH$_2$ |

-continued

| | | |
|---|---|---|
| TR-18: | $X^1, X^2, X^3$: | —O— |
| | $R^{31}, R^{33}, R^{34}, R^{36}, R^{37}, R^{39}$: | —O—(CH$_2$)$_9$—O—CO—CH=CH$_2$ |
| TR-19: | $X^1, X^2, X^3$: | —O— |
| | $R^{31}, R^{32}, R^{33}, R^{34}, R^{35}, R^{36}, R^{37}, R^{38}, R^{39}$: | —O—(CH$_2$)$_9$—O—CO—CH=CH$_2$ |
| TR-20: | $X^1, X^2$: | —O— |
| | $X^3$: | —NH— |
| | $R^{32}, R^{35}, R^{38}$: | —O—(CH$_2$)$_9$—O—CO—CH=CH$_2$ |
| TR-21: | $X^1, X^2$: | —O— |
| | $X^3$: | —NH— |
| | $R^{32}, R^{35}$: | —O—(CH$_2$)$_4$—O—CO—CH=CH$_2$ |
| | $R^{38}$: | —(CH$_2$)$_{12}$—CH$_3$ |
| TR-22: | $X^1, X^2$: | —O— |
| | $X^3$: | —NH— |
| | $R^{32}, R^{35}$: | —O—(CH$_2$)$_4$—O—CO—CH=CH$_2$ |
| | $R^{37}, R^{38}$: | —O—(CH$_2$)$_{12}$—CH$_3$ |
| TR-23: | $X^1, X^2$: | —O— |
| | $X^3$: | —NH— |
| | $R^{32}, R^{35}$: | —O—(CH$_2$)$_4$—O—CO—CH=CH$_2$ |
| | $R^{38}$: | —O—CO—(CH$_2$)$_{11}$—CH$_3$ |
| TR-24: | $X^1$: | —O— |
| | $X^2, X^3$: | —NH— |
| | $R^{31}, R^{33}$: | —O—(CH$_2$)$_{12}$—CH$_3$ |
| | $R^{35}, R^{38}$: | —O—(CH$_2$)$_9$—O—CO—CH=CH$_2$ |
| TR-25: | $X^1$: | —O— |
| | $X^2, X^3$: | —NH— |
| | $R^{31}, R^{32}$: | —O—(CH$_2$)$_6$—O—CO—CH=CH$_2$ |
| | $R^{35}, R^{38}$: | —O—(CH$_2$)$_{11}$—CH$_3$ |
| TR-26: | $X^1$: | —O— |
| | $X^2, X^3$: | —NH— |
| | $R^{31}, R^{32}, R^{33}$: | —O—(CH$_2$)$_6$—O—CO—CH=CH$_2$ |
| | $R^{35}, R^{38}$: | —O—(CH$_2$)$_{11}$—CH$_3$ |
| TR-27: | $X^1, X^2$: | —NH— |
| | $X^3$: | —S— |
| | $R^{32}, R^{35}$: | —O—(CH$_2$)$_9$—O—CO—CH=CH$_2$ |
| | $R^{38}$: | —O—CO—(CH$_2$)$_{11}$—CH$_3$ |
| TR-28: | $X^1, X^2$: | —NH— |
| | $X^3$: | —S— |
| | $R^{31}, R^{32}, R^{34}, R^{35}$: | —O—(CH$_2$)$_9$—O—CO—CH=CH$_2$ |
| | $R^{38}$: | —O—CO—(CH$_2$)$_{11}$—CH$_3$ |
| TR-29: | $X^1, X^2$: | —NH— |
| | $X^3$: | —S— |
| | $R^{32}, R^{35}$: | —O—(CH$_2$)$_4$—CH=CH—(CH$_2$)$_4$—O—CO—CH=CH$_2$ |
| | $R^{38}$: | —O—CO—(CH$_2$)$_{11}$—CH$_3$ |
| TR-30: | $X^1, X^2$: | —NH— |
| | $X^3$: | —S— |
| | $R^{31}, R^{32}, R^{34}, R^{35}$: | —O—(CH$_2$)$_4$—CH=CH—(CH$_2$)$_4$—O—CO—CH=CH$_2$ |
| | $R^{38}$: | —O—CO—(CH$_2$)$_{11}$—CH$_3$ |
| TR-31: | $X^1, X^2$: | —NH— |
| | $X^3$: | —S— |
| | $R^{31}, R^{33}, R^{34}, R^{36}$: | —O—(CH$_2$)$_9$—O—CO—CH=CH$_2$ |
| | $R^{38}$: | —O—CO—(CH$_2$)$_{11}$—CH$_3$ |
| TR-32: | $X^1, X^2$: | —NH— |
| | $X^3$: | —S— |
| | $R^{31}, R^{32}, R^{33}, R^{34}, R^{35}, R^{36}$: | —O—(CH$_2$)$_9$—O—CO—CH=CH$_2$ |
| | $R^{38}$: | —O—CO—(CH$_2$)$_{11}$—CH$_3$ |
| TR-33: | $X^1, X^2$: | —O— |
| | $X^3$: | —S— |
| | $R^{32}, R^{35}, R^{38}$: | —O—(CH$_2$)$_9$—O—CO—CH=CH$_2$ |
| TR-34: | $X^1, X^2$: | —O— |
| | $X^3$: | —S— |
| | $R^{32}, R^{35}$: | —O—(CH$_2$)$_4$—O—CO—CH=CH$_2$ |
| | $R^{38}$: | —O—(CH$_2$)$_{12}$—CH$_3$ |
| TR-35: | $X^1, X^2$: | —O— |
| | $X^3$: | —S— |
| | $R^{32}, R^{35}$: | —O—(CH$_2$)$_4$—O—CO—CH=CH$_2$ |
| | $R^{37}, R^{38}$: | —O—(CH$_2$)$_{12}$—CH$_3$ |
| TR-36: | $X^1, X^2$: | —O— |
| | $X^3$: | —S— |
| | $R^{32}, R^{35}$: | —O—(CH$_2$)$_4$—O—CO—CH=CH$_2$ |
| | $R^{38}$: | —O—CO—(CH$_2$)$_{11}$—CH$_3$ |
| TR-37: | $X^1$: | —O— |
| | $X^2, X^3$: | —S— |
| | $R^{31}, R^{33}$: | —O—(CH$_2$)$_{12}$—CH$_3$ |
| | $R^{35}, R^{38}$: | —O—(CH$_2$)$_9$—O—CO—CH=CH$_2$ |
| TR-38: | $X^1$: | —O— |
| | $X^2, X^3$: | —S— |
| | $R^{31}, R^{32}$: | —O—(CH$_2$)$_6$—O—CO—CH=CH$_2$ |
| | $R^{35}, R^{38}$: | —O—(CH$_2$)$_{11}$—CH$_3$ |

-continued

| | | |
|---|---|---|
| TR-39: | $X^1$: | —O— |
| | $X^2$, $X^3$: | —S— |
| | $R^{31}$, $R^{32}$, $R^{33}$: | —O—$(CH_2)_6$—O—CO—CH=$CH_2$ |
| | $R^{35}$, $R^{38}$: | —O—$(CH_2)_{11}$—$CH_3$ |
| TR-40: | $X^1$, $X^2$, $X^3$: | —S— |
| | $R^{32}$, $R^{35}$, $R^{38}$: | —O—$(CH_2)_9$—O—CO—CH=$CH_2$ |
| TR-41: | $X^1$, $X^2$, $X^3$: | —S— |
| | $R^{31}$, $R^{32}$, $R^{34}$, $R^{35}$, $R^{37}$, $R^{38}$: | —O—$(CH_2)_9$—O—CO—CH=$CH_2$ |
| TR-42: | $X^1$, $X^2$, $X^3$: | —S— |
| | $R^{32}$, $R^{35}$, $R^{38}$: | —O—$(CH_2)_4$—CH=CH—$(CH_2)_4$—O—CO—CH=$CH_2$ |
| TR-43: | $X^1$, $X^2$, $X^3$: | —S— |
| | $R^{31}$, $R^{32}$, $R^{34}$, $R^{35}$, $R^{37}$, $R^{38}$: | —O—$(CH_2)_4$—CH=CH—$(CH_2)_4$—O—CO—CH=$CH_2$ |
| TR-44: | $X^1$, $X^2$, $X^3$: | —S— |
| | $R^{31}$, $R^{33}$, $R^{34}$, $R^{36}$, $R^{37}$, $R^{39}$: | —O—$(CH_2)_9$—O—CO—CH=$CH_2$ |
| TR-45: | $X^1$, $X^2$, $X^3$: | —S— |
| | $R^{31}$, $R^{32}$, $R^{33}$, $R^{34}$, $R^{35}$, $R^{36}$, $R^{37}$, $R^{38}$, $R^{39}$: | —O—$(CH_2)_9$—O—CO—CH=$CH_2$ |
| TR-46: | $X^1$, $X^2$: | —S— |
| | $X^3$: | —NH— |
| | $R^{32}$, $R^{35}$, $R^{38}$: | —O—$(CH_2)_9$—O—CO—CH=$CH_2$ |
| TR-47: | $X^1$, $X^2$: | —S— |
| | $X^3$: | —NH— |
| | $R^{32}$, $R^{35}$: | —O—$(CH_2)_4$—O—CO—CH=$CH_2$ |
| | $R^{38}$: | —O—$(CH_2)_{12}$—$CH_3$ |
| TR-48: | $X^1$, $X^2$: | —S— |
| | $X^3$: | —NH— |
| | $R^{32}$, $R^{35}$: | —O—$(CH_2)_4$—O—CO—CH=$CH_2$ |
| | $R^{37}$, $R^{38}$: | —O—$(CH_2)_{12}$—$CH_3$ |
| TR-49: | $X^1$, $X^2$: | —S— |
| | $X^3$: | —NH— |
| | $R^{32}$, $R^{35}$: | —O—$(CH_2)_4$—O—CO—CH=$CH_2$ |
| | $R^{38}$: | —O—CO—$(CH_2)_{11}$—$CH_3$ |
| TR-50: | $X^1$: | —O— |
| | $X^2$: | —NH— |
| | $X^3$: | —S— |
| | $R^{31}$, $R^{33}$: | —O—$(CH_2)_{12}$—$CH_3$ |
| | $R^{35}$: | —O—$(CH_2)_9$—O—CO—CH=$CH_2$ |
| | $R^{38}$: | —O—$(CH_2)_{12}$—$CH_3$ |
| TR-51: | $X^1$: | —O— |
| | $X^2$: | —NH— |
| | $X^3$: | —S— |
| | $R^{31}$, $R^{33}$: | —O—$(CH_2)_6$—O—CO—CH=$CH_2$ |
| | $R^{35}$: | —O—$(CH_2)_{11}$—$CH_3$ |
| | $R^{38}$: | —O—$(CH_2)_{12}$—$CH_3$ |
| TR-52: | $X^1$: | —O— |
| | $X^2$: | —NH— |
| | $X^3$: | —S— |
| | $R^{31}$, $R^{32}$, $R^{33}$: | —O—$(CH_2)_6$—O—CO—CH=$CH_2$ |
| | $R^{35}$: | —O—$(CH_2)_{11}$—$CH_3$ |
| | $R^{38}$: | —O—$(CH_2)_{12}$—$CH_3$ |
| TR-53: | $X^1$, $X^2$, $X^3$: | —O— |
| | $R^{32}$, $R^{35}$, $R^{38}$: | —O—$(CH_2)_9$—O-EpEt |
| TR-54: | $X^1$, $X^2$, $X^3$: | —O— |
| | $R^{31}$, $R^{32}$, $R^{34}$, $R^{35}$, $R^{37}$, $R^{38}$: | —O—$(CH_2)_9$—O-EpEt |
| TR-55: | $X^1$, $X^2$, $X^3$: | —O— |
| | $R^{32}$, $R^{35}$, $R^{38}$: | —O—$(CH_2)_4$—CH=CH—$(CH_2)_4$—O-EpEt |
| TR-56: | $X^1$, $X^2$, $X^3$: | —O— |
| | $R^{31}$, $R^{32}$, $R^{34}$, $R^{35}$, $R^{37}$, $R^{38}$: | —O—$(CH_2)_4$—CH=CH—$(CH_2)_4$—O-EpEt |
| TR-57: | $X^1$, $X^2$, $X^3$: | —O— |
| | $R^{31}$, $R^{33}$, $R^{34}$, $R^{36}$, $R^{37}$, $R^{39}$: | —O—$(CH_2)_9$—O-EpEt |
| TR-58: | $X^1$, $X^2$, $X^3$: | —O— |
| | $R^{32}$, $R^{35}$, $R^{38}$: | —O—$(CH_2)_9$—O—CH=$CH_2$ |
| TR-59: | $X^1$, $X^2$: | —O— |
| | $X^3$: | —NH— |
| | $R^{32}$, $R^{35}$, $R^{338}$: | —O—$(CH_2)_9$—O-EpEt |
| TR-60: | $X^1$, $X^2$: | —O— |
| | $X^3$: | —NH— |
| | $R^{32}$, $R^{35}$: | —O—$(CH_2)_4$—O-EpEt |
| | $R^{38}$: | —O—$(CH_2)_{12}$—$CH_3$ |
| TR-61: | $X^1$, $X^2$: | —O— |
| | $X^3$: | —NH— |
| | $R^{32}$, $R^{35}$: | —O—$(CH_2)_4$—O-EpEt |
| | $R^{37}$, $R^{38}$: | —O—$(CH_2)_{12}$—$CH_3$ |
| TR-62: | $X^1$, $X^2$: | —O— |
| | $X^3$: | —NH— |
| | $R^{32}$, $R^{35}$: | —O—$(CH_2)_4$—O-EpEt |
| | $R^{38}$: | —O—CO—$(CH_2)_{11}$—$CH_3$ |

-continued

| | | |
|---|---|---|
| TR-63: | $X^1$: | —O— |
| | $X^2, X^3$: | —NH— |
| | $R^{31}, R^{33}$: | —O—$(CH_2)_{12}$—$CH_3$ |
| | $R^{35}, R^{38}$: | —O—$(CH_2)_9$—O-EpEt |
| TR-64: | $X^1$: | —O— |
| | $X^2, X^3$: | —NH— |
| | $R^{31}, R^{32}$: | —O—$(CH_2)_6$—O-EpEt |
| | $R^{35}, R^{38}$: | —O—$(CH_2)_{11}$—$CH_3$ |
| TR-65: | $X^1, X^2$: | —O— |
| | $X^3$: | —NH— |
| | $R^{32}, R^{35}, R^{38}$: | —O—$(CH_2)_9$—O—CH=$CH_2$ |
| (Remark) | Non-defined R: | Not substituted (hydrogen atom) |
| | EpEt: | epoxyethyl |

The compound having 1,3,5-triazine ring is preferably a melamine compound represented by the following formula (IV).

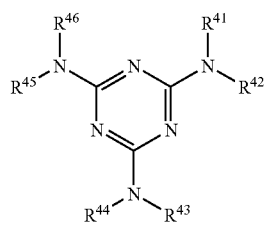

(IV)

in which each of $R^{41}$, $R^{43}$ and $R^{45}$ is independently an alkyl group having 1 to 30 carbon atoms or hydrogen atom; each of $R^{42}$, $R^{44}$ and $R^{46}$ is independently an alkyl group, an alkenyl group, an aryl group or a heterocyclic group; or otherwise $R^{41}$ and $R^{42}$, $R^{43}$ and $R^{44}$ or $R^{45}$ and $R^{46}$ are connected to each other to form a heterocyclic ring.

Each of $R^{41}$, $R^{43}$ and $R^{45}$ is preferably an alkyl group having 1 to 20 carbon atoms or hydrogen atom, more preferably an alkyl group having 1 to 10 carbon atoms or hydrogen atom, further preferably an alkyl group having 1 to 6 carbon atoms or hydrogen atom, most preferably hydrogen atom.

Each of $R^{42}$, $R^{44}$ and $R^{46}$ is preferably an aryl group.

The aforementioned definition and examples of substituent group of the alkyl group, the alkenyl group and the aryl group in the formula (III) can be also applied for each of the above groups in the formula (IV).

The aforementioned description of the heterocyclic group in which a nitrogen atom has a dissociated valence in the formula (III) can be also applied for the heterocyclic ring formed by $R^{41}$ and $R^{42}$, $R^{43}$ and $R^{44}$ or $R^{45}$ and $R^{46}$.

At least one of $R^{42}$, $R^{44}$ and $R^{46}$ preferably includes an alkylene or alkenylene moiety having 9 to 30 carbon atoms. The alkylene or alkenylene moiety having 9 to 30 carbon atoms preferably has a straight chain structure. The alkylene or alkenylene moiety is preferably included in the substituent group of the aryl group.

Further, at least one of $R^{42}$, $R^{44}$ and $R^{46}$ preferably has a polymerizable group as a substituent group. The melamine compound preferably has two or more polymerizable groups. The polymerizable group is preferably placed at the terminal end of $R^{42}$, $R^{44}$ or $R^{46}$.

If the melamine compound has a polymerizable group, the resultant optically anisotropic layer can contain the discotic liquid crystal molecules polymerized with the melamine compound.

The $R^{42}$, $R^{44}$ or $R^{46}$ having a polymerizable group as a substituent group is the same as the aforementioned group represented by the formula (Rp).

Examples of the melamine compound are shown below.

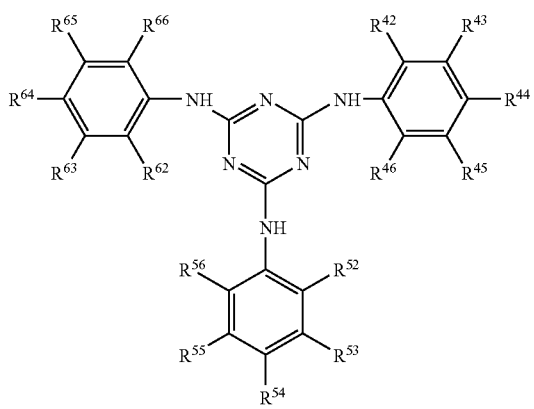

(MM-1 to M-46)

| | | |
|---|---|---|
| MM-1: | $R^{43}, R^{44}, R^{53}, R^{54}, R^{63}, R^{64}$: | —O—$(CH_2)_9$—$CH_3$ |
| MM-2: | $R^{43}, R^{44}, R^{53}, R^{54}, R^{63}, R^{64}$: | —O—$(CH_2)_{11}$—$CH_3$ |
| MM-3: | $R^{43}, R^{44}, R^{53}, R^{54}, R^{63}, R^{64}$: | —O—$(CH_2)_{15}$—$CH_3$ |

-continued

| | | |
|---|---|---|
| MM-4: | $R^{44}, R^{54}, R^{64}$: | $-O-(CH_2)_9-CH_3$ |
| MM-5: | $R^{44}, R^{54}, R^{64}$: | $-O-(CH_2)_{15}-CH_3$ |
| MM-6: | $R^{43}, R^{53}, R^{63}$: | $-O-CH_3$ |
| | $R^{44}, R^{54}, R^{64}$: | $-O-(CH_2)_{17}-CH_3$ |
| MM-7: | $R^{44}, R^{54}, R^{64}$: | $-CO-O-(CH_2)_{11}-CH_3$ |
| MM-8: | $R^{44}, R^{54}, R^{64}$: | $-SO_2-NH-(CH_2)_{17}-CH_3$ |
| MM-9: | $R^{43}, R^{53}, R^{63}$: | $-O-CO-(CH_2)_{15}-CH_3$ |
| | $R^{42}, R^{52}, R^{62}$: | $-O-(CH_2)_{17}-CH_3$ |
| MM-10: | $R^{42}, R^{52}, R^{62}$: | $-O-CH_3$ |
| MM-11: | $R^{43}, R^{53}, R^{63}$: | $-CO-O-(CH_2)_{11}-CH_3$ |
| | $R^{42}, R^{52}, R^{62}$: | $-Cl$ |
| MM-12: | $R^{43}, R^{53}, R^{63}$: | $-CO-O-(CH_2)_{11}-CH_3$ |
| | $R^{42}, R^{52}, R^{62}$: | $-O-(CH_2)_{11}-CH_3$ |
| MM-13: | $R^{45}, R^{55}, R^{65}$: | $-SO_2-NH-iso-C_3H_7$ |
| | $R^{42}, R^{52}, R^{62}$: | $-Cl$ |
| MM-14: | $R^{45}, R^{55}, R^{65}$: | $-SO_2-NH-(CH_2)_{15}-CH_3$ |
| | $R^{42}, R^{46}, R^{52}, R^{56}, R^{62}, R^{66}$: | $-Cl$ |
| MM-15: | $R^{45}, R^{55}, R^{65}$: | $-SO_2-NH-(CH_2)_{19}-CH_3$ |
| MM-16: | $R^{43}, R^{54}$: | $-O-(CH_2)_9-CH_3$ |
| | $R^{44}, R^{53}, R^{63}, R^{64}$: | $-O-(CH_2)_{11}-CH_3$ |
| MM-17: | $R^{44}$: | $-O-(CH_2)_{11}-CH_3$ |
| | $R^{54}$: | $-O-(CH_2)_{15}-CH_3$ |
| | $R^{64}$: | $-O-(CH_2)_{17}-CH_3$ |
| MM-18: | $R^{42}, R^{45}, R^{52}, R^{55}, R^{62}, R^{65}$: | $-O-CH_3$ |
| | $R^{44}, R^{54}, R^{64}$: | $-NH-CO-(CH_2)_{14}-CH_3$ |
| MM-19: | $R^{42}, R^{45}, R^{52}, R^{55}, R^{62}, R^{65}$: | $-O-(CH_2)_3-CH_3$ |
| | $R^{44}, R^{54}, R^{64}$: | $-O-(CH_2)_{15}-CH_3$ |
| MM-20: | $R^{42}, R^{52}, R^{62}$: | $-NH-SO_2-(CH_2)_{15}-CH_3$ |
| | $R^{44}, R^{54}, R^{54}, R^{55}, R^{64}, R^{65}$: | $-Cl$ |
| MM-21: | $R^{42}, R^{43}, R^{52}, R^{53}, R^{62}, R^{63}$: | $-F$ |
| | $R^{44}, R^{45}, R^{64}$: | $-CO-NH-(CH_2)_{15}-CH_3$ |
| | $R^{45}, R^{46}, R^{55}, R^{56}, R^{65}, R^{66}$: | $-Cl$ |
| MM-22: | $R^{42}, R^{52}, R^{62}$: | $-Cl$ |
| | $R^{44}, R^{54}, R^{64}$: | $-CH_3$ |
| | $R^{45}, R^{55}, R^{65}$: | $-NH-CO-(CH_2)_{12}-CH_3$ |
| MM-23: | $R^{42}, R^{52}, R^{62}$: | $-OH$ |
| | $R^{44}, R^{54}, R^{64}$: | $-CH_3$ |
| | $R^{45}, R^{55}, R^{65}$: | $-O-(CH_2)_{15}-CH_3$ |
| MM-24: | $R^{42}, R^{45}, R^{52}, R^{55}, R^{62}, R^{65}$: | $-O-CH_3$ |
| | $R^{44}, R^{54}, R^{64}$: | $-(CH_2)_{11}-CH_3$ |
| MM-25: | $R^{42}, R^{52}, R^{62}$: | $-NH-SO_2-CH_3$ |
| | $R^{45}, R^{55}, R^{65}$: | $-CO-O-(CH_2)_{11}-CH_3$ |
| MM-26: | $R^{42}, R^{52}, R^{62}$: | $-S-(CH_2)_{11}-CH_3$ |
| | $R^{45}, R^{55}, R^{65}$: | $-SO_2-NH_2$ |
| MM-27: | $R^{43}, R^{44}, R^{53}, R^{54}, R^{63}, R^{64}$: | $-O-(CH_2)_{12}-O-CO-CH=CH_2$ |
| MM-28: | $R^{43}, R^{44}, R^{53}, R^{54}, R^{63}, R^{64}$: | $-O-(CH_2)_8-O-CO-CH=CH_2$ |
| MM-29: | $R^{43}, R^{44}, R^{53}, R^{54}, R^{63}, R^{64}$: | $-O-CO-(CH_2)_7-O-CO-CH=CH_2$ |
| MM-30: | $R^{44}, R^{54}, R^{64}$: | $-CO-O-(CH_2)_{12}-O-CO-C(CH_3)=CH_2$ |
| MM-31: | $R^{43}, R^{44}, R^{53}, R^{54}, R^{63}, R^{64}$: | $-O-CO-p-Ph-O-(CH_2)_4-O-CO-CH=CH_2$ |
| MM-32: | $R^{42}, R^{44}, R^{52}, R^{54}, R^{62}, R^{64}$: | $-NH-SO_2-(CH_2)_8-O-CO-CH=CH_2$ |
| | $R^{45}, R^{55}, R^{65}$: | $-Cl$ |
| MM-33: | $R^{42}, R^{52}, R^{62}$: | $-NH-SO_2-CH_3$ |
| | $R^{45}, R^{55}, R^{65}$: | $-CO-O-(CH_2)_{12}-O-CO-CH=CH_2$ |
| MM-34: | $R^{44}, R^{54}, R^{64}$: | $-O-(CH_2)_9-O-CO-CH=CH_2$ |
| MM-35: | $R^{43}, R^{44}, R^{53}, R^{54}, R^{63}, R^{64}$: | $-O-(CH_2)_9-O-CO-CH=CH_2$ |
| MM-36: | $R^{44}, R^{54}, R^{64}$: | $-O-(CH_2)_4-CH=CH-(CH_2)_4-O-CO-CH=CH_2$ |
| MM-37: | $R^{43}, R^{44}, R^{53}, R^{54}, R^{63}, R^{64}$: | $-O-(CH_2)_4-CH=CH-(CH_2)_4-O-CO-CH=CH_2$ |
| MM-38: | $R^{43}, R^{45}, R^{53}, R^{55}, R^{63}, R^{65}$: | $-O-(CH_2)_9-O-CO-CH=CH_2$ |
| MM-39: | $R^{43}, R^{44}, R^{45}, R^{53}, R^{54}, R^{55}, R^{63}, R^{64}, R^{65}$: | $-O-(CH_2)_9-O-CO-CH=CH_2$ |
| MM-40: | $R^{44}, R^{54}$: | $-O-(CH_2)_4-O-CO-CH=CH_2$ |
| | $R^{64}$: | $-O-(CH_2)_9-O-CO-CH=CH_2$ |
| MM-41: | $R^{44}, R^{54}$: | $-O-(CH_2)_4-O-CO-CH=CH_2$ |
| | $R^{64}$: | $-O-(CH_2)_{12}-CH_3$ |
| MM-42: | $R^{44}, R^{54}$: | $-O-(CH_2)_4-O-CO-CH=CH_2$ |
| | $R^{63}, R^{64}$: | $-O-(CH_2)_{12}-CH_3$ |
| MM-43: | $R^{44}, R^{54}$: | $-O-(CH_2)_4-O-CO-CH=CH_2$ |
| | $R^{63}, R^{64}$: | $-O-CO-(CH_2)_{11}-CH_3$ |
| MM-44: | $R^{43}, R^{45}$: | $-O-(CH_2)_{12}-CH_3$ |
| | $R^{54}, R^{64}$: | $-O-(CH_2)_9-O-CO-CH=CH_2$ |
| MM-45: | $R^{43}, R^{44}$: | $-O-(CH_2)_6-O-CO-CH=CH_2$ |
| | $R^{54}, R^{64}$: | $-O-(CH_2)_{11}-CH_3$ |
| MM-46: | $R^{43}, R^{44}, R^{45}$: | $-O-(CH_2)_6-O-CO-CH=CH_2$ |
| | $R^{54}, R^{64}$: | $-O-(CH_2)_{11}-CH_3$ |
| (Remark) | Non-defined R: | Not substituted (hydrogen atom) |
| | p-Ph: | p-phenylene |

-continued (MM-47 to MM-59)

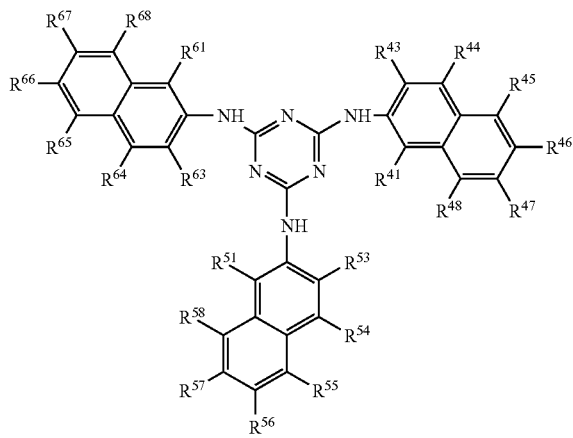

| | | |
|---|---|---|
| MM-47: | $R^{46}, R^{56}, R^{66}$: | $—SO_2—NH—(CH_2)_{15}—CH_3$ |
| | $R^{48}, R^{58}, R^{68}$: | $—O—(CH_2)_{11}—CH_3$ |
| MM-48: | $R^{45}, R^{55}, R^{65}$: | $—SO_2—NH—(CH_2)_{17}—CH_3$ |
| MM-49: | $R^{46}, R^{56}, R^{66}$: | $—SO_2—NH—(CH_2)_{15}—CH_3$ |
| MM-50: | $R^{45}, R^{55}, R^{65}$: | $—O—(CH_2)_{17}—CH_3$ |
| | $R^{47}, R^{57}, R^{67}$: | $—SO_2—NH—CH_3$ |
| MM-51: | $R^{43}, R^{53}, R^{63}$: | $—O—(CH_2)_{15}—CH_3$ |
| MM-52: | $R^{41}, R^{51}, R^{61}$: | $—O—(CH_2)_{17}—CH_3$ |
| MM-53: | $R^{46}, R^{56}, R^{66}$: | $—SO_2—NH-Ph$ |
| | $R^{28}, R^{58}, R^{68}$: | $—O—(CH_2)_{11}—CH_3$ |
| MM-54: | $R^{45}, R^{55}, R^{65}$: | $—O—(CH_2)_{21}—CH_3$ |
| | $R^{47}, R^{57}, R^{67}$: | $—SO_2—NH-Ph$ |
| MM-55: | $R^{41}, R^{51}, R^{61}$: | $-p-Ph-(CH_2)_{11}—CH_3$ |
| MM-56: | $R^{46}, R^{48}, R^{56}, R^{58}, R^{66}, R^{68}$: | $—SO_2—NH—(CH_2)_7—CH_3$ |
| MM-57: | $R^{46}, R^{56}, R^{66}$: | $—SO_2—NH—(CH_2)_{10}—O—CO—CH=CH_2$ |
| | $R^{48}, R^{58}, R^{68}$: | $—O—(CH_2)_{12}—CH_3$ |
| MM-58: | $R^{45}, R^{55}, R^{65}$: | $—O—(CH_2)_{12}—O—CO—CH=CH_2$ |
| | $R^{47}, R^{57}, R^{67}$: | $—SO_2—NH-Ph$ |
| MM-59: | $R^{43}, R^{53}, R^{63}$: | $—O—(CH_2)_{16}—O—CO—CH=CH_2$ |
| (Remark) | Non-defined R: | Not substituted (hydrogen atom) |
| | Ph: | phenyl |
| | p-Ph: | p-phenylene |

(MM-60 to MM-71)

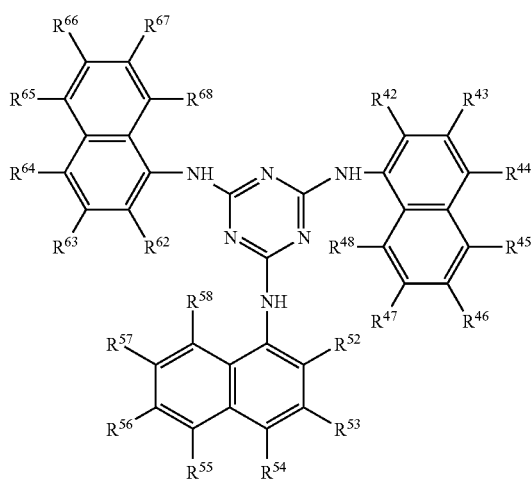

| | | |
|---|---|---|
| MM-60: | $R^{45}, R^{55}, R^{65}$: | $—NH—CO—(CH_2)_{14}—CH_3$ |
| MM-61: | $R^{42}, R^{52}, R^{62}$: | $—O—(CH_2)_{17}—CH_3$ |
| MM-62: | $R^{44}, R^{54}, R^{64}$: | $—O—(CH_2)_{15}—CH_3$ |
| MM-63: | $R^{45}, R^{55}, R^{65}$: | $—SO_2—NH—(CH_2)_{15}—CH_3$ |
| MM-64: | $R^{43}, R^{53}, R^{63}$: | $—CO—NH—(CH_2)_{17}—CH_3$ |
| | $R^{44}, R^{54}, R^{64}$: | $—OH$ |
| MM-65: | $R^{45}, R^{55}, R^{65}$: | $—O—(CH_2)_{15}—CH_3$ |
| | $R^{46}, R^{56}, R^{66}$: | $—SO_2—NH—(CH_2)_{11}—CH_3$ |
| MM-66: | $R^{47}, R^{57}, R^{67}$: | $—O—(CH_2)_{21}—CH_3$ |

-continued

| | | |
|---|---|---|
| MM-67: | $R^{44}, R^{54}, R^{64}$: | —O-p-Ph-$(CH_2)_{11}$—$CH_3$ |
| MM-68: | $R^{46}, R^{56}, R^{66}$: | —$SO_2$—NH—$(CH_2)_{15}$—$CH_3$ |
| MM-69: | $R^{43}, R^{53}, R^{63}$: | —CO—NH—$(CH_2)_{17}$—$CH_3$ |
| | $R^{44}, R^{54}, R^{64}$: | —O—$(CH_2)_{12}$—O—CO—CH=$CH_2$ |
| MM-70: | $R^{45}, R^{55}, R^{65}$: | —O—$(CH_2)_8$—O—CO=$CH_2$ |
| | $R^{46}, R^{56}, R^{66}$: | —$SO_2$—NH—$(CH_2)_{11}$—$CH_3$ |
| MM-71: | $R^{43}, R^{46}, R^{53}, R^{56}, R^{63}, R^{66}$: | —$SO_2$—NH—$(CH_2)_8$—O—CO—CH=$CH_2$ |
| (Remark) | Non-defined R: | Not substituted (hydrogen atom) |
| | p-Ph: | p-phenylene |

(MM-72 to MM-75)

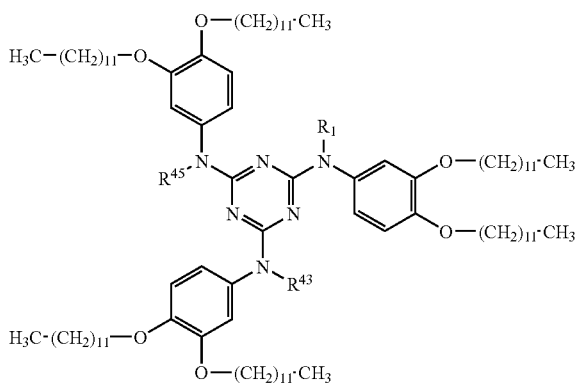

| | | |
|---|---|---|
| MM-72: | $R^{41}, R^{43}, R^{45}$: | —$CH_3$ |
| MM-73: | $R^{41}, R^{43}, R^{45}$: | —$C_2H_5$ |
| MM-74: | $R^{41}, R^{43}$: | —$C_2H_5$ |
| | $R^{45}$: | —$CH_3$ |
| MM-75: | $R^{41}, R^{43}, R^{45}$: | —$(CH_2)_3$—$CH_3$ |

(MM-76 to MM-88)

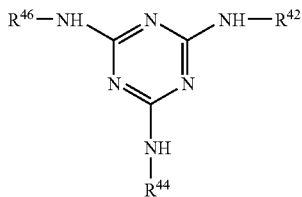

| | | |
|---|---|---|
| MM-76: | $R^{42}, R^{44}, R^{46}$: | —$(CH_2)_9$—O—CO—CH=$CH_2$ |
| MM-77: | $R^{42}, R^{44}, R^{46}$: | —$(CH_2)_4$—CH=CH—$(CH_2)_4$—O—CO—CH=$CH_2$ |
| MM-78: | $R^{42}, R^{44}$: | —$(CH_2)_9$—O—CO—CH=$CH_2$ |
| | $R^{46}$: | —$(CH_2)_{12}$—$CH_3$ |
| MM-79: | $R^{42}, R^{44}$: | —$(CH_2)_4$1'CH=CH—$(CH_2)_4$—O—CO—CH=$CH_2$ |
| | $R^{446}$: | —$(CH_2)_{12}$—$CH_3$ |
| MM-80: | $R^{42}$: | —$(CH_2)_9$—O—CO—CH=$CH_2$ |
| | $R^{44}, R^{46}$: | —$(CH_2)_{12}$—$CH_3$ |
| MM-81: | $R^{42}$: | —$(CH_2)_4$—CH=CH—$(CH_2)_4$—O—CO—CH=$CH_2$ |
| | $R^{44}, R^{46}$: | —$(CH_2)_{12}$—$CH_3$ |
| MM-82: | $R^{42}, R^{44}$: | —$(CH_2)_4$—O—CO—CH=$CH_2$ |
| | $R^{46}$: | —$(CH_2)_{12}$—$CH_3$ |
| MM-83: | $R^{42}$: | —$(CH_2)_4$—O—CO—CH=$CH_2$ |
| | $R^{44}, R^{46}$: | —$(CH_2)_{12}$—$CH_3$ |
| MM-84: | $R^{42}, R^{44}, R^{46}$: | —$(CH_2)_9$—O-EpEt |
| MM-85: | $R^{42}, R^{44}, R^{46}$: | —$(CH_2)_4$—CH=CH—$(CH_2)_4$—O-EpEt |
| MM-86: | $R^{42}, R^{44}$: | —$(CH_2)_9$—O-EpEt |
| | $R^{46}$: | —$(CH_2)_{12}$—$CH_3$ |
| MM-87: | $R^{42}, R^{44}, R^{46}$: | —$(CH_2)_9$—O—CH=$CH_2$ |
| MM-88: | $R^{42}, R^{44}$: | —$(CH_2)_9$—O—CH=$CH_2$ |
| | $R^{46}$: | —$(CH_2)_{12}$—$CH_3$ |
| (Remark) | EpEt: | epoxyethyl |

-continued (MM-89 to MM-95)

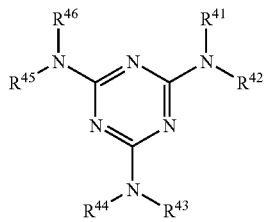

| | | |
|---|---|---|
| MM-89: | $R^{41}, R^{42}, R^{43}, R^{44}, R^{45}, R^{46}$: | —$(CH_2)_9$—$CH_3$ |
| MM-90: | $R^{41}, R^{43}, R^{45}$: | —$CH_3$ |
| | $R^{42}, R^{44}, R^{46}$: | —$(CH_2)_{17}$—$CH_3$ |
| MM-91: | $R^{41}, R^{42}, R^{43}, R^{44}$: | —$(CH_2)_7$—$CH_3$ |
| | $R^{45}, R^{446}$: | —$(CH_2)_5$—$CH_3$ |
| MM-92: | $R^{41}, R^{42}, R^{43}, R^{44}, R^{45}, R^{46}$: | -CyHx |
| MM-93: | $R^{41}, R^{42}, R^{43}, R^{44}, R^{45}, R^{46}$: | —$(CH_2)_2$—O—$C_2H_5$ |
| MM-94: | $R^{41}, R^{43}, R^{45}$: | —$CH_3$ |
| | $R^{42}, R^{44}, R^{46}$: | —$(CH_2)_{12}$—O—CO—CH=$CH_2$ |
| MM-95: | $R^{41}, R^{42}, R^{43}, R^{44}, R^{45}, R^{46}$: | —$(CH_2)_8$—O—CO—CH=$CH_2$ |
| (Remark) | CyHx: | cyclohexyl |

(MM-96)

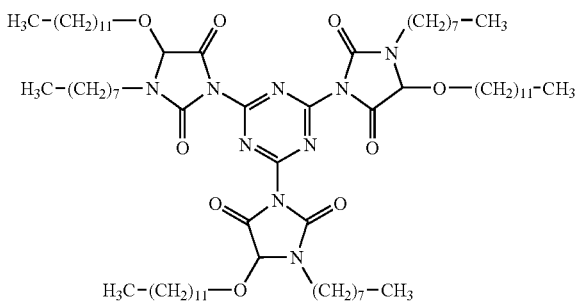

A melamine polymer can be also used as the melamine compound. The melamine polymer is preferably synthesized by the polymerization reaction between a carbonyl compound and the melamine compound represented by the following formula (V).

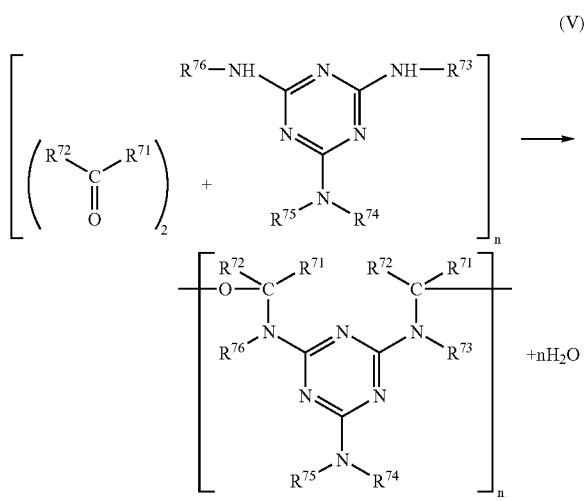

(V)

in which each of $R^{71}, R^{72}, R^{73}, R^{74}, R^{75}$ and $R^{76}$ is independently hydrogen atom, an alkyl group, an alkenyl group, an aryl group or a heterocyclic group.

The aforementioned definition and examples of substituent group of the alkyl group, the alkenyl group, the aryl group and the heterocyclic group in the formula (III) can be also applied for each of the above groups in the formula (V).

The polymerization reaction between the carbonyl compound and the melamine compound is the same as an usual synthesis method for known melamine resins (e.g., melamine formaldehyde resin). A commercially available melamine polymer (melamine resin) may be used.

The melamine polymer preferably has a molecular weight of 2,000 to 400,000.

At least one of $R^{71}, R^{72}, R^{73}, R^{74}, R^{75}$ and $R^{76}$ preferably has an alkylene or alkenylene moiety having 9 to 30 carbon atoms. The alkylene or alkenylene moiety having 9 to 30 carbon atoms preferably has a straight chain structure. The alkylene or alkenylene moiety is preferably included in the substituent group of the aryl group.

Further, at least one of $R^{71}, R^{72}, R^{73}, R^{74}, R^{75}$ and $R^{76}$ preferably has a polymerizable group as a substituent group. The polymerizable group is preferably placed at the terminal end of $R^{71}, R^{72}, R^{73}, R^{74}, R^{75}$ or $R^{76}$.

If the melamine polymer has a polymerizable group, the resultant optically anisotropic layer can contain the discotic liquid crystal molecules polymerized with the melamine polymer.

The $R^{71}, R^{72}, R^{73}, R^{74}, R^{75}$ or $R^{76}$ having a polymerizable group as a substituent group is the same as the aforementioned group represented by the formula (Rp).

The polymerizable group is introduced into either the carbonyl compound ($R^{71}, R^{72}$) or the melamine compound ($R^{73}$, $R^{74}$, $R^{75}$, $R^{76}$). If the melamine compound has the polymerizable group, the carbonyl compound is preferably a compound of simple structure such as formaldehyde. On the other hand, if the carbonyl compound has the polymerizable group, the melamine compound is preferably a compound of simple structure such as non-substituted melamine.

Examples of the carbonyl compound having a polymerizable group are shown below.

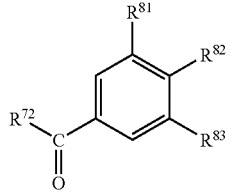

(CO-1 to CO-11)

| | | |
|---|---|---|
| CO-1: | $R^{72}$: | —H |
| | $R^{82}$: | —O—(CH$_2$)$_9$—O—CO—CH=CH$_2$ |
| CO-2: | $R^{72}$: | —H |
| | $R^{81}$, $R^{82}$: | —O—(CH$_2$)$_9$—O—CO—CH=CH$_2$ |
| CO-3: | $R^{72}$: | —H |
| | $R^{82}$: | —O—(CH$_2$)$_4$—CH=CH—(CH$_2$)$_4$—O—CO—CH=CH$_2$ |
| CO-4: | $R^{72}$: | —H |
| | $R^{81}$, $R^{82}$: | —O—(CH$_2$)$_4$—CH=CH—(CH$_2$)$_4$—O—CO—CH=CH$_2$ |
| CO-5: | $R^{72}$: | —H |
| | $R^{81}$, $R^{83}$: | —O—(CH$_2$)$_9$—O—CO—CH=CH$_2$ |
| CO-6: | $R^{72}$: | —H |
| | $R^{81}$, $R^{82}$, $R^{83}$: | —O—(CH$_2$)$_9$—O—CO—CH=CH$_2$ |
| CO-7: | $R^{72}$: | —CH$_3$ |
| | $R^{82}$: | —O—(CH$_2$)$_9$—O—CO—CH=CH$_2$ |
| CO-8: | $R^{72}$: | —(CH$_2$)$_{11}$—CH$_3$ |
| | $R^{82}$: | —O—(CH$_2$)$_4$—O—CO—CH=CH$_2$ |
| CO-9: | $R^{72}$: | —(CH$_2$)$_9$—O—CO—CH=CH$_2$ |
| | $R^{82}$: | —O—(CH$_2$)$_4$—O—CO—CH=CH$_2$ |
| CO-10: | $R^{72}$: | —(CH$_2$)$_9$—O—CO-EpEt |
| | $R^{82}$: | —O—(CH$_2$)$_4$—O—CO—CH=CH$_2$ |
| CO-11: | $R^{72}$: | —(CH$_2$)$_4$—O—CO—CH=CH$_2$ |
| | $R^{81}$, $R^{83}$: | —O—(CH$_2$)$_{12}$—CH$_3$ |
| (Remark) | Non-defined R: | Not substituted (hydrogen atom) |
| | EpEt: | epoxyethyl |

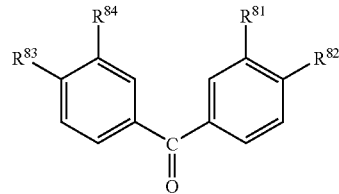

(CO-12 to CO-13)

| | | |
|---|---|---|
| CO-12: | $R^{81}$, $R^{82}$, $R^{83}$, $R^{84}$: | —O—(CH$_2$)$_6$—O—CO—CH=CH$_2$ |
| CO-13: | $R^{82}$, $R^{83}$: | —O—(CH$_2$)$_9$—O—CO—CH=CH$_2$ |
| (Remark) | Non-defined R: | Not substituted (hydrogen atom) |

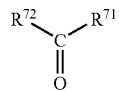

(CO-14 to CO-26)

| | | |
|---|---|---|
| CO-14: | $R^{71}$: | —(CH$_2$)$_9$—O—CO—CH=CH$_2$ |
| | $R^{72}$: | —H |
| CO-15: | $R^{71}$: | —(CH$_2$)$_4$—CH=CH—(CH$_2$)$_4$—O—CO—CH=CH$_2$ |
| | $R^{72}$: | —H |
| CO-16: | $R^{71}$: | —(CH$_2$)$_9$—O—CO—CH=CH$_2$ |
| | $R^{72}$: | —CH$_3$ |
| CO-17: | $R^{71}$: | —(CH$_2$)$_4$—CH=CH—(CH$_2$)$_4$—O—CO—CH=CH$_2$ |
| | $R^{72}$: | —CH$_3$ |
| CO-18: | $R^{71}$: | —(CH$_2$)$_9$—O—CO—CH=CH$_2$ |
| | $R^{72}$: | -Ph |
| CO-19: | $R^{71}$: | —(CH$_2$)$_4$—CH=CH—(CH$_2$)$_4$—O—CO—CH=CH$_2$ |
| | $R^{72}$: | -Ph |
| CO-20: | $R^{71}$: | —(CH$_2$)$_4$—O—CO—CH=CH$_2$ |
| | $R^{72}$ | —(CH$_2$)$_9$—O—CO—CH=CH$_2$ |

| | | -continued |
|---|---|---|
| CO-21: | $R^{712}$: | —(CH$_2$)$_4$—O—CO—CH=CH$_2$ |
| | $R^{72}$: | —(CH$_2$)$_{12}$—CH$_3$ |
| CO-22: | $R^{71}$: | —(CH$_2$)$_9$—O-EpEt |
| | $R^{72}$: | —H |
| CO-23: | $R^{71}$: | —(CH$_2$)$_4$—CH=CH—(CH$_2$)$_4$—O-EpEt |
| | $R^{72}$: | —H |
| CO-24: | $R^{71}$, $R^{72}$: | —(CH$_2$)$_9$—O-EpEt |
| CO-25: | $R^{71}$, $R^{72}$: | —(CH$_2$)$_9$—O—CO—CH=CH$_2$ |
| CO-26: | $R^{71}$, $R^{72}$: | —(CH$_2$)$_4$—CH=CH—(CH$_2$)$_4$—O—CO—CH=CH$_2$ |
| (Remark) | Ph: | phenyl |
| | EpEt: | epoxyethyl |

Examples of the melamine polymer having a polymerizable group at the melamine moiety are shown below.

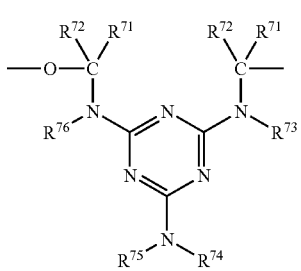

(MP-1 to MP-14)

| MP-1: | $R^{73}$, $R^{75}$, $R^{76}$: | —CH$_2$—NH—CO—CH=CH$_2$ |
|---|---|---|
| | $R^{74}$: | —CH$_2$—NH—CO—(CH$_2$)$_8$—CH$_3$ |
| MP-2: | $R^{71}$: | —CH$_3$ |
| | $R^{73}$, $R^{75}$, $R^{76}$: | —CH$_2$—NH—CO—CH=CH$_2$ |
| | $R^{74}$: | —CH$_2$—NH—CO—(CH$_2$)$_8$—CH$_3$ |
| MP-3: | $R^{71}$, $R^{72}$: | —CH$_3$ |
| | $R^{73}$, $R^{75}$, $R^{76}$: | —CH$_2$—NH—CO—CH=CH$_2$ |
| | $R^{74}$: | —CH$_2$—NH—CO—(CH$_2$)$_8$—CH$_3$ |
| MP-4: | $R^{71}$: | -Ph |
| | $R^{73}$, $R^{75}$, $R^{76}$: | —CH$_2$—NH—CO—CH=CH$_2$ |
| | $R^{74}$: | —CH$_2$—NH—CO—(CH$_2$)$_8$—CH$_3$ |
| MP-5: | $R^{73}$, $R^{76}$: | —CH$_2$—NH—CO—CH=CH$_2$ |
| | $R^{74}$: | —CH$_2$—NH—CO—(CH$_2$)$_7$—CH=CH—(CH$_2$)$_7$—CH$_3$ |
| | $R^{75}$: | —CH$_2$—O—CH$_3$ |
| MP-6: | $R^{73}$, $R^{76}$: | —CH$_2$—NH—CO—CH=CH$_2$ |
| | $R^{74}$: | —CH$_2$—NH—CO—(CH$_2$)$_7$—CH=CH—(CH$_2$)$_7$—CH$_3$ |
| | $R^{75}$: | —CH$_2$—OH |
| MP-7: | $R^{73}$, $R^{76}$: | —CH$_2$—NH—CO—C$_2$H$_5$ |
| | $R^{74}$: | —CH$_2$—NH—CO—(CH$_2$)$_{16}$—CH$_3$ |
| | $R^{75}$: | —CH$_2$—O—CH$_3$ |
| MP-8: | $R^{73}$, $R^{76}$: | —CH$_2$—NH—CO—C$_2$H$_5$ |
| | $R^{74}$: | —CH$_2$—NH—CO—(CH$_2$)$_{16}$—CH$_3$ |
| | $R^{75}$: | —CH$_2$—OH |
| MP-9: | $R^{73}$, $R^{76}$: | —CH$_2$—O—CO—CH=CH$_2$ |
| | $R^{74}$: | —CH$_2$—O—CO—(CH$_2$)$_7$—CH=CH—(CH$_2$)$_7$—CH$_3$ |
| | $R^{75}$: | —CH$_2$—O—CH$_3$ |
| MP-10: | $R^{73}$, $R^{76}$: | —CH$_2$—O—CO—CH=CH$_2$ |
| | $R^{74}$: | —CH$_2$—O—CO—(CH$_2$)$_7$—CH=CH—(CH$_2$)$_7$—CH$_3$ |
| | $R^{75}$: | —CH$_2$—OH |
| MP-11: | $R^{73}$, $R^{76}$: | —CH$_2$—O—CO—(CH$_2$)$_7$—CH=CH—(CH$_2$)$_7$—CH$_3$ |
| | $R^{74}$: | —CH$_2$—NH—CO—(CH$_2$)$_7$—CH=CH—(CH$_2$)$_7$—CH$_3$ |
| | $R^{75}$: | —CH$_2$—O—CH$_3$ |
| MP-12: | $R^{73}$, $R^{76}$: | —CH$_2$—O—CO—(CH$_2$)$_7$—CH=CH—(CH$_2$)$_7$—CH$_3$ |
| | $R^{74}$: | —CH$_2$—NH—CO—(CH$_2$)$_7$—CH=CH—(CH$_2$)$_7$—CH$_3$ |
| | $R^{75}$: | —CH$_2$—OH |
| MP-13: | $R^{73}$, $R^{74}$, $R^{75}$, $R^{76}$: | —CH$_2$—O—(CH$_2$)$_{11}$—O—CO—CH=CH$_2$ |
| MP-14: | $R^{73}$, $R^{75}$, $R^{76}$: | —CH$_2$—NH—CO—CH=CH$_2$ |
| | $R^{74}$: | —CH$_2$—O—(CH$_2$)$_{16}$—CH$_3$ |
| (Remark) | Nondefined R: | Not substituted (hydrogen atom) |
| | Ph: | phenyl |

Two or more compounds having 1,3,5-triazine ring (including melamine compounds and melamine polymers) may be used in combination.

The compound having 1,3,5-triazine ring is used preferably in an amount of 0.01 to 20 wt. %, more preferably in an amount of 0.1 to 15 wt. %, and most preferably in an amount of 0.5 to 10 wt. % based on the amount of the discotic liquid crystal molecules.

The coating amount of the compound having 1,3,5-triazine ring is preferably in the range of 1 to 1,000 mg/m$^2$, more preferably in the range of 2 to 300 mg/m$^2$, and most preferably in the range of 3 to 100 mg/m$^2$.

Preferred examples of the rod-like liquid crystal molecules include azomethines, azoxy molecules, cyanobiphenyls, cyanophenyl esters, benzoic esters, phenyl cyclohexanecarbonate esters, cycnophenylcyclohexanes, cyanosubstituted phenylpyrimidines, alkoxy-substituted phenylpyrimidines, phenyldioxanes, tolans and alkenylcyclohexylbenzonitriles. Further, some metal complexes can be used as the rod-like liquid crystal molecules.

Descriptions of the rod-like liquid crystal molecules are found in "Kagaku-Sosetsu, Ekisho no Kageku" (written in Japanese), vol. 22(1994), Chapters 4, 7 and 11; and "Ekisho Devise Handbook" (written in Japanese), chapter 3.

The birefringent refractive index of the rod-like liquid crystal molecules is preferably in the range of 0.001 to 0.7. The rod-like liquid crystal molecules preferably have polymerizable groups. Examples of the polymerizable groups are the same as those of the discotic liquid crystal molecules (Q).

The rod-like liquid crystal molecule preferably has a symmetrical structure about the short axis, and hence preferably has polymerizable groups at both ends.

Examples of the rod-like liquid crystal molecule are shown below.

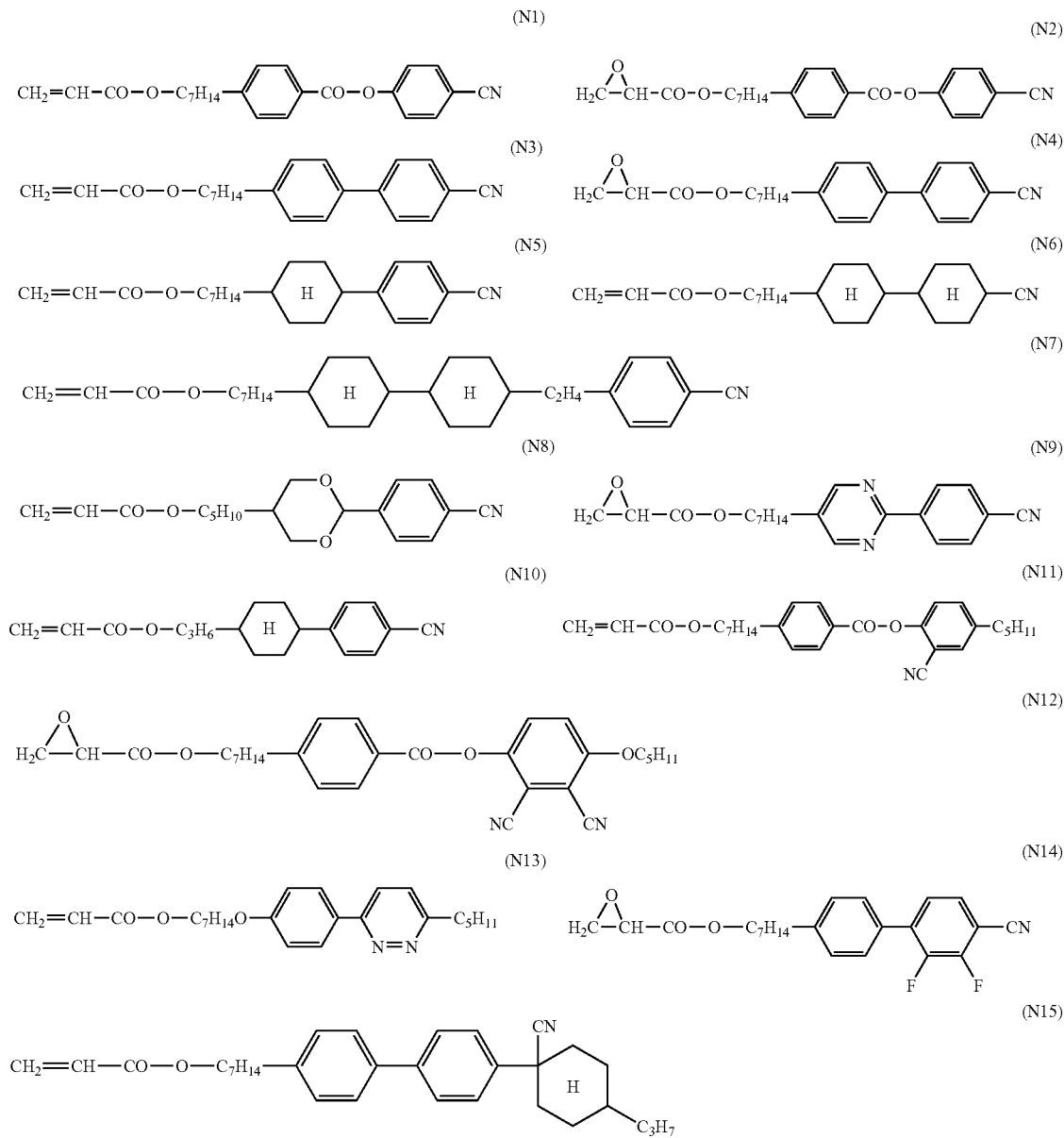

-continued
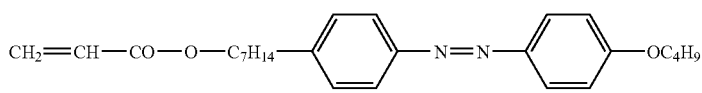 (N16)
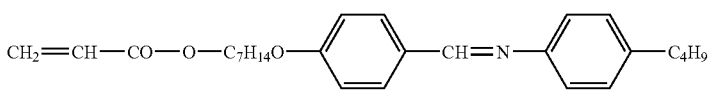 (N17)
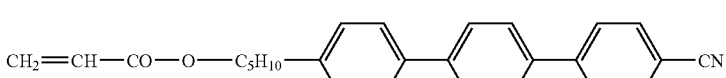 (N18)
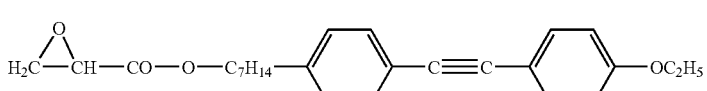 (N19)
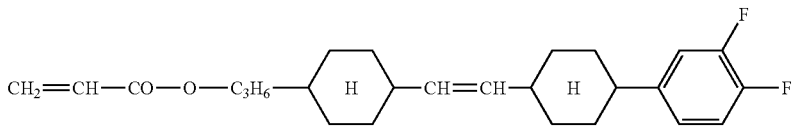 (N20)
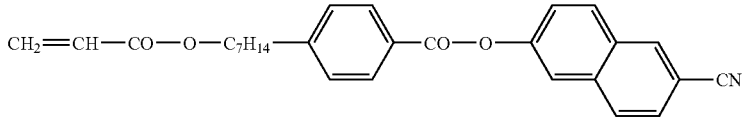 (N21)
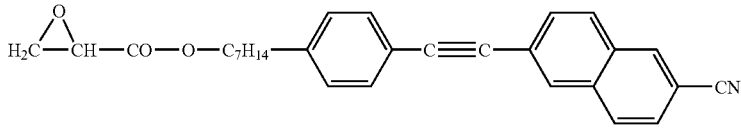 (N22)
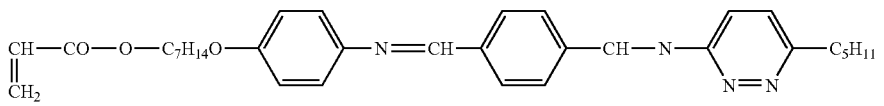 (N23)
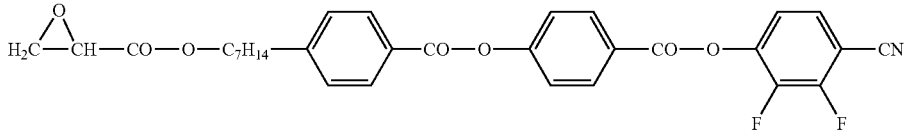 (N24)
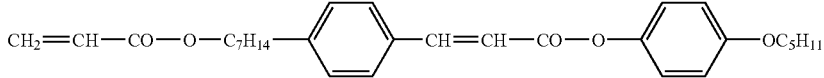 (N25)
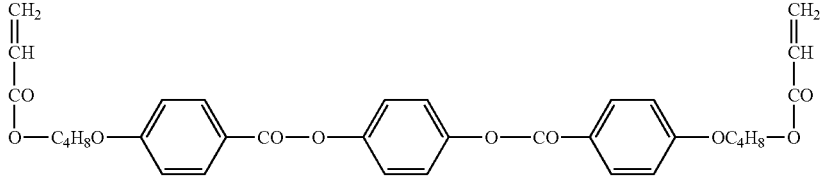 (N26)
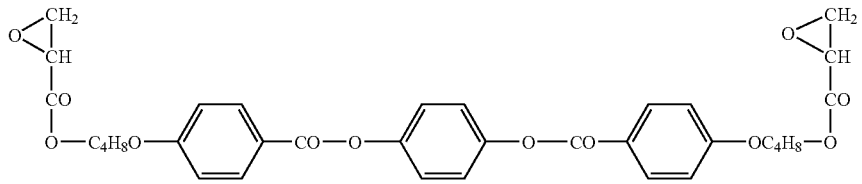 (N27)

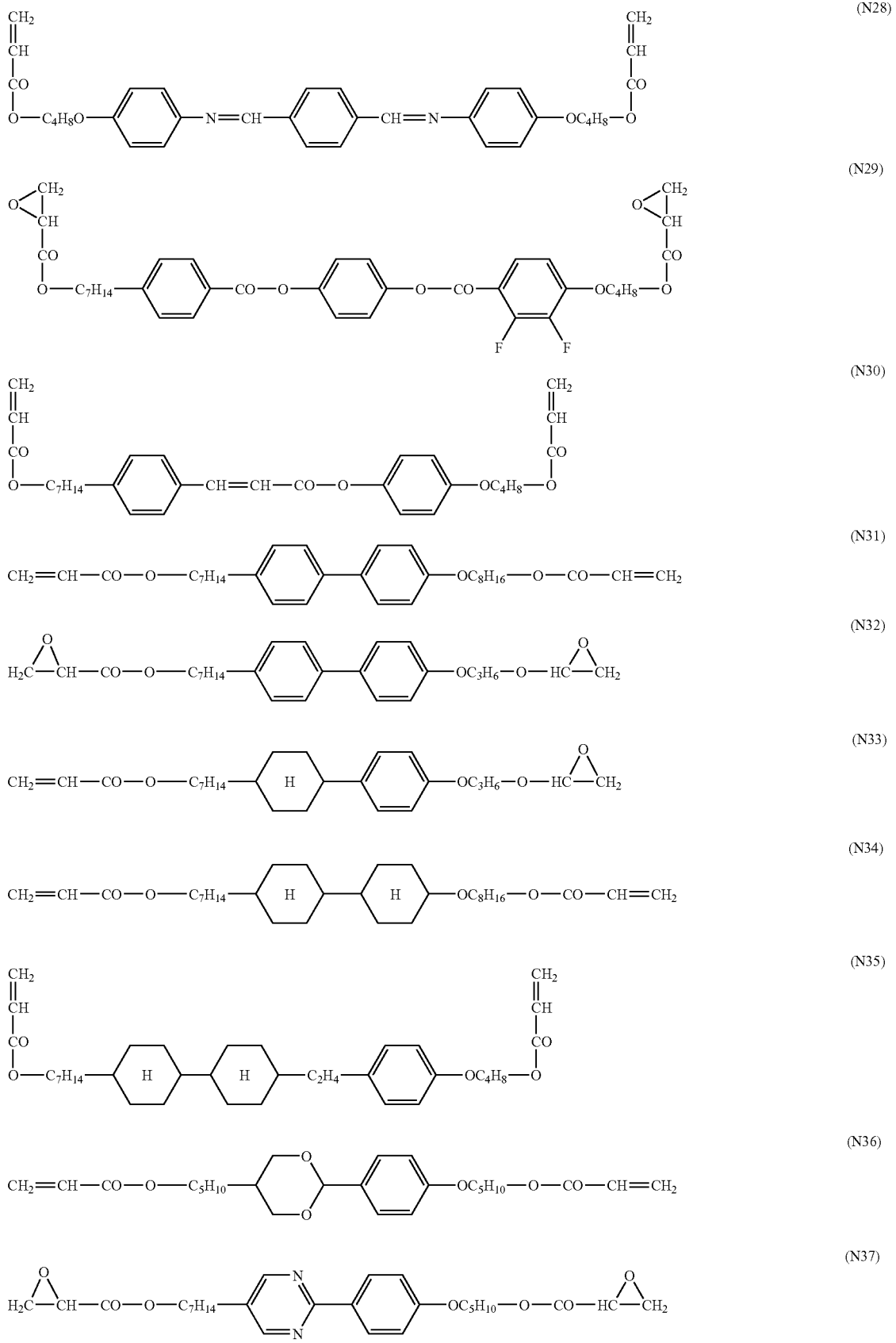

-continued
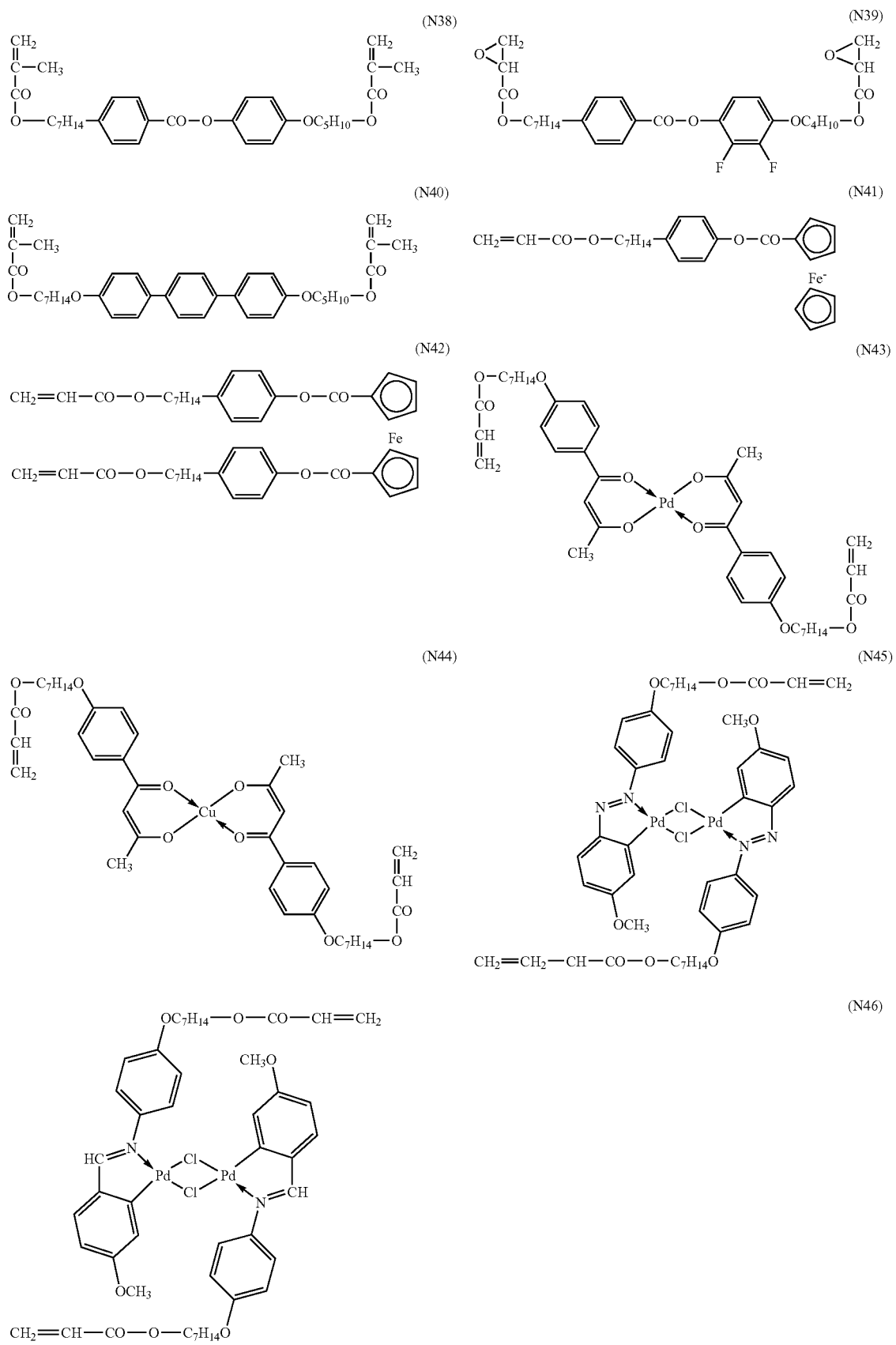

(N47)

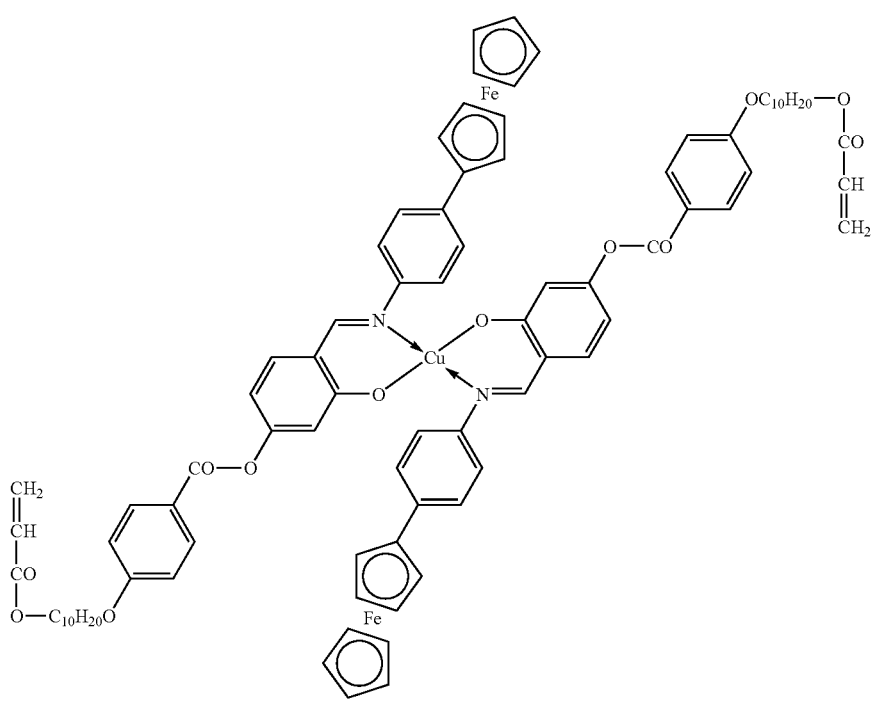

An optically anisotropic layer can be formed by coating an orientation layer with a liquid crystal composition (coating solution) containing the liquid crystal molecules, a polymerization initiator (described below) and optional additives (e.g., plasticizer, monomer, surface active agent, cellulose ester, 1,3,5-triazine compound, chiral agent).

A solvent for the composition preferably is an organic solvent. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The composition can be coated according to a conventional coating method such as a wire-bar coating method, an extrusion coating method, a direct gravure coating method, a reverse gravure coating method or a die coating method.

The polymerization reaction can be classified into a thermal reaction with a thermal polymerization initiator and a photo reaction with a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ per $cm^2$, and more preferably in the range of 100 to 800 mJ per $cm^2$. The light irradiation can be conducted while the layer is heated to accelerate the photo polymerization reaction.

The thickness of the optically anisotropic layer (the thickness of each layer if two or more optical compensatory sheets are provided) is preferably in the range of 0.1 to 20 μm, more preferably in the range of 0.5 to 15 μm, and most preferably in the range of 1 to 10 μm.

[Transparent Support]

The transparent support is a polymer film or a glass plate, preferably a polymer film. The term "transparent" means that light transmittance is not less than 80%.

As the transparent support, an optically isotropic polymer film is generally used. The term "optical isotropic" means that a retardation value in plane (Re) of the film is preferably not more than 10 nm, more preferably not more than 5 nm. A retardation value along the thickness direction (Rth) of the film is preferably not more than 10 nm, more preferably not more than 5 nm. The Re and Rth retardation values are defined by the following formulas:

$Re=(nx-ny) \times d$ $Rth=[\{(nx+ny)/2\}-nz] \times d$ in which each of nx and ny is a refractive index in plane of the transparent support; nz is a refractive index along the thickness direction of the transparent support; and d is the thickness of the transparent support.

According to mode of the liquid crystal display, there is a case that an optically anisotropic polymer film is used as the transparent support. In that case, the optically anisotropy of the optically anisotropic layer and that of the transparent support cooperatively correspond to (namely, cooperatively compensate) the optically anisotropy of the liquid crystal cell. The optically anisotropic support preferably has an optically uniaxial birefringence or an optically biaxial birefringence. If the support is optically uniaxial, it may be either optically positive (the refractive index parallel to the optical axis is larger than that perpendicular to the optical axis) or optically negative (the refractive index perpendicular to the optical axis is larger than that parallel to the optical axis). In the case that the support is optically biaxial, the values of nx, ny and nz in the above formula are different from each other.

In the optically anisotropic transparent support, a retardation value in plane (Re) is preferably in the range of 10 to 1,000 nm, more preferably in the range of 20 to 200 nm, and most preferably in the range of 20 to 100 nm. A retardation value along the thickness direction (Rth) is preferably in the range of 10 to 1,000 nm, more preferably in the range of 70 to 500 nm, further preferably in the range of 70 to 300 nm, and most preferably in the range of 70 to 200 nm.

Materials for the transparent support are determined according to whether it is optically isotropic or optically anisotropic. The optically isotropic transparent support is generally made of glass or cellulose ester. The optically anisotropic transparent support is generally made of synthetic polymers (e.g., polycarbonate, polysulfone, polyethersulfone, polyacrylate, polymethacrylate, norbornene resin). According to European Patent No. 0,911,656 A2, a optically anisotropic cellulose ester film (giving high retardation) can be prepared (1) with a retardation increasing agent, (2) from a cellulose ester having a low acetylation degree or (3) according to the cooling dissolution method.

The transparent support of polymer film is formed preferably according to the solvent casting method.

The optically anisotropic transparent support is preferably obtained by stretching a polymer film.

The optically uniaxial support can be obtained by a normal uniaxial or biaxial stretching.

The optically biaxial support is preferably produced by unbalance biaxial stretching. The procedure of unbalance biaxial stretching comprises the steps of: stretching a film along one direction to expand by a certain extent (e.g., 3 to 100%, preferably 5 to 30%), and then stretching the film vertically to the direction of the first stretching to expand by a more extent than that in the first stretching (e.g., 6 to 200%, preferably 10 to 90%). In the procedure, the film may be stretched along the two vertical directions at the same time.

The direction of stretching (direction of high extension in the case of unbalance biaxial stretching) is preferably essentially parallel to the slow axis in plane of the stretched film. Here "essentially parallel" means that the angle between the stretching direction and the slow axis is preferably in the range of less than 10°, more preferably less than 5°, most preferably less than 3°.

The transparent support has a thickness preferably in the range of 10 to 500 μm, and more preferably in the range of 50 to 200 μm.

The transparent support can be subjected to a surface treatment (e.g., glow discharge treatment, corona discharge treatment, ultraviolet (UV) treatment, flame treatment) to improve adhesion to a layer formed on the support (e.g., adhesive layer, orientation layer, optically anisotropic layer). The support may contain UV absorber.

An adhesive layer (undercoating layer) can be provided on the transparent support. Japanese Patent Provisional Publication No. 7(1995)-333433 describes the adhesive layer. The adhesive layer has a thickness preferably in the range of 0.1 to 2 μm, more preferably 0.2 to 1 μm.

[Orientation Layer]

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light. The orientation layer is preferably formed by rubbing a polymer. The rubbing treatment can be conducted by rubbing a polymer layer with paper or cloth several times along a certain direction.

For aligning the liquid crystal molecules in an average inclined angle of not more than 5°, a polymer which does not lower the surface energy of the orientation layer (namely, a polymer usually used for the orientation layer) is preferred.

The orientation layer preferably has a thickness of 0.01 to 5 μm, more preferably 0.05 to 1 μm.

After the liquid crystal molecules are aligned by the orientation layer to form an optically anisotropic layer, the optically anisotropic layer can be transferred to the transparent support. The aligned and fixed liquid crystal molecules can keep the alignment without the orientation layer.

Alignment in an average inclined angle of less than 5° C. can be obtained without rubbing treatment nor the orientation layer. However, even in that case, an orientation layer which chemically combines with the liquid crystal molecules on the interface can be provided so as to improve adhesion between the molecules and the support (Japanese Patent Provisional Publication No. 9(1997)-152509). Such orientation layer does not need the rubbing treatment.

In the case that two liquid crystal layers are provided on the same side of the transparent support, the layer beforehand provided on the support can function as the orientation layer for the other layer provided thereon.

[Polarizing Membrane]

As the polarizing membrane, various membranes are known. Examples of the polarizing membranes include an iodine polarizing membrane, a polyene polarizing membrane and a dichromatic dye polarizing membrane. The iodine polarizing membrane and the dye polarizing membrane are generally prepared from polyvinyl alcohol films. The polarizing axis of the membrane is perpendicular to the stretching direction of the film.

The transparent axis in plane of the polarizing membrane is preferably essentially parallel or perpendicular to the direction obtained by projecting the long axes of the rod-like liquid crystal molecules onto the support surface on average.

[Protective Film]

A transparent polymer film is used as the transparent protective film. The term "transparent" means that light transmittance is not less than 80%.

A cellulose acetate film, preferably a triacetyl cellulose film, is generally used. The cellulose acetate film is preferably formed according to the solvent casting method.

The thickness of the protective film is preferably in the range of 20 to 500 μm, more preferably in the range of 50 to 200 μm.

[Liquid Crystal Display]

The present invention can be applied for liquid crystal displays of various modes. Examples of the display modes include TN (twisted nematic) mode, IPS (in plane switching) mode, FLC (ferroelectric liquid crystal) mode, OCB (optically compensatory bend) mode, STN (super twisted nematic) mode, VA (vertically aligned) mode, ECB (electrically controlled birefringence) mode and HAN (hybrid aligned nematic) mode. Optical compensatory sheets for these modes are known. The optical compensatory sheet of the invention is suitable for a liquid crystal display having a liquid crystal cell of VA mode, OCB mode or HAN mode, in which many rod-like liquid crystal molecules are vertically aligned. The optical compensatory sheet of the invention is particularly suitable for VA mode in which most rod-like liquid crystal molecules are vertically aligned.

The liquid crystal cell of VA mode include three types:

(1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied;

(2) a liquid crystal cell of MVA mode (described in SID97, Digest of tech. Papers, 28(1997), 845), in which the VA mode is modified to be multi-domain type so as to enlarge the viewing angle;

(3) a liquid crystal cell of n-ASM mode (described in Nippon Ekisho Toronkai [Liquid crystal forum of Japan], Digest of tech. Papers (1998), 58–59), in which rod-like liquid crystal molecules are essentially vertically aligned while voltage is not applied, and the molecules are essentially oriented in twisted multi-domain alignment while voltage is applied; and (4) a liquid crystal cell of SURVAIVAL mode (published in LCD international 98).

EXAMPLE 1

(Preparation of Optical Compensatory Sheet)

On one surface of a cellulose triacetate film, cellulose diacetate is applied and dried to form an undercoating layer (an orientation layer not subjected to rubbing treatment) of 0.5 μm dry thickness.

Then, 90 weight parts of the following discotic liquid crystal compound (1), 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1 weight part of a sensitizer (Kayacure DETX, Nippon Kayaku Co., Ltd.) were dissolved in methyl ethyl ketone to prepare a coating solution [solid content: 38 wt. %].

Discotic Liquid Crystal Compound (1)

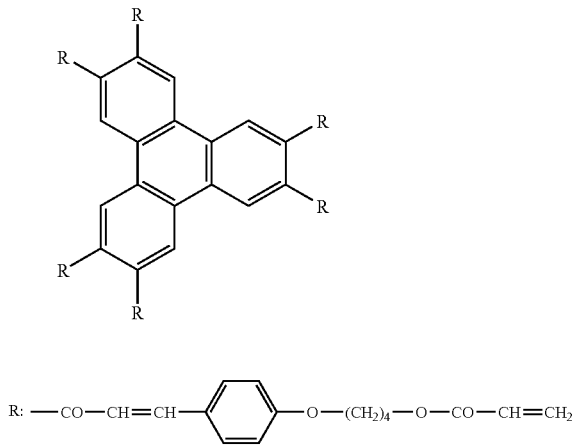

The coating solution was applied and dried on the undercoating layer. Immediately after the applied solution was heated at 130° C. for 2 minutes to align the discotic liquid crystal molecules, the solution was cooled to room temperature and irradiated with ultraviolet light (500 mJ/cm$^2$) to polymerize the discotic liquid crystal molecules. Thus, the alignment of the discotic liquid crystal molecules was fixed to form an optically anisotropic layer of 1.7 μm thickness.

The angle dependence of retardation of the optically anisotropic layer was measured by means of an ellipsometer [M-150, JASCO], and thereby the inclined angle and the Rth (retardation value along the thickness direction) were found 0.2° and 88 nm, respectively.

On the other surface of the cellulose triacetate film, an optically uniaxial polycarbonate film was laminated with an adhesive to prepare an optical compensatory sheet.

The optically uniaxial polycarbonate film had an optical axis in the plane. The retardation value in plane (Re) and the retardation value along the thickness direction (Rth) were 50 nm and 30 nm, respectively.

The Re and Rth of the prepared optical compensatory sheet were 50 nm and 100 nm, respectively.

(Preparation of Elliptically Polarizing Plate)

A polarizing membrane and a transparent protective film were overlaid in this order on the transparent support (polycarbonate film) side of the optical compensatory sheet, to prepare an elliptically polarizing plate.

The polarizing membrane was placed so that the slow axis of the support might be parallel to the polarizing axis of the membrane.

(Preparation of Liquid Crystal Display)

From a commercially available liquid crystal display of VA mode [LCD 5000], an elliptically polarizing plate was peeled. In place of it, the above-prepared elliptically polarizing plate was laminated.

With respect to the prepared display, the contrast data in all directions were measured. The viewing angle giving a contrast ratio of 20:1 was 160° (upward-downward-rightward-leftward). On the other hand, the viewing angle giving a contrast ratio of 20:1 in the commercially available liquid crystal display was 120° (upward-downward-rightward-leftward).

EXAMPLE 2

(Preparation of Optically Biaxial Transparent Support)

87 Weight parts of cellulose triacetate, 10 weight parts of triphenyl phosphate and 3 weight parts of UV absorber (TM165, Sumitomo Chemical Co., Ltd.) were dissolved in methylene chloride, to prepare a solution [solid content: 18 wt. %]. The solution was cast on a glass plate, and dried at 40° C. for 20 minutes to form a film. The formed film (thickness: 100 μm) was peeled off the glass plate.

Onto the formed cellulose triacetate film, a stress of 20 kg/mm$^2$ was applied at 145° C. for 10 minutes. Thus, an optically biaxial transparent support having Re of 20 nm and Rth of 80 nm was prepared.

(Preparation of Optical Compensatory Sheet)

The coating solution for optically anisotropic layer used in Example 1 was applied on the optically biaxial transparent support in the amount of 3 ml/m$^2$, and dried at room temperature. The applied solution was heated at 130° C. for 1 minute to align the discotic liquid crystal molecules, and irradiated with ultraviolet light to polymerize the discotic liquid crystal molecules. Thus, the alignment of the discotic liquid crystal molecules was fixed.

The angle dependence of retardation of the optically anisotropic layer was measured by means of an ellipsometer [M-150, JASCO], and thereby the inclined angle was found 0.1°. The Re and Rth of the prepared optical compensatory sheet were 20 nm and 140 nm, respectively.

(Preparation of Elliptically Polarizing Plate)

A polarizing membrane and a transparent protective film were overlaid in this order on the transparent support side of the optical compensatory sheet, to prepare a elliptically polarizing plate.

The polarizing membrane was placed so that the slow axis of the support might be parallel to the polarizing axis of the membrane.

(Preparation of Liquid Crystal Display)

From a commercially available liquid crystal display of VA mode [LCD 5000], an elliptically polarizing plate was peeled. In place of it, the above-prepared elliptically polarizing plate was laminated.

With respect to the prepared display, the contrast data in all directions were measured. The viewing angle giving a contrast ratio of 20:1 was 160° (upward-downward-rightward-leftward).

EXAMPLE 3

(Preparation of Optically Biaxial Transparent Support)

85 Weight parts of cellulose triacetate, 10 weight parts of triphenyl phosphate and 5 weight parts of UV absorber (TM165, Sumitomo Chemical Co., Ltd.) were dissolved in methylene chloride, to prepare a solution [solid content: 18 wt. %]. The solution was cast on a glass plate, and dried at 40° C. for 20 minutes to form a film. The formed film (thickness: 100 μm) was peeled off the glass plate.

Onto the formed cellulose triacetate film, a stress of 20 kg/mm$^2$ was applied at 145° C. for 10 minutes. Thus, an optically biaxial transparent support having Re of 50 nm and Rth of 120 nm was prepared.

(Preparation of Optical Compensatory Sheet)

The coating solution for optically anisotropic layer used in Example 1 was applied on the optically biaxial transparent support in the amount of 6 ml/m$^2$, and dried at room temperature. The applied solution was heated at 130° C. for 1 minute to align the discotic liquid crystal molecules, and irradiated with ultraviolet light to polymerize the discotic liquid crystal molecules. Thus, the alignment of the discotic liquid crystal molecules was fixed.

The angle dependence of retardation of the optically anisotropic layer was measured by means of an ellipsometer [M-150, JASCO], and thereby the inclined angle was found 0.5°. The Re and Rth of the prepared optical compensatory sheet were 50 nm and 250 nm, respectively.

(Preparation of Elliptically Polarizing Plate)

A polarizing membrane and a transparent protective film were overlaid in this order on the transparent support side of the optical compensatory sheet, to prepare a elliptically polarizing plate.

The polarizing membrane was placed so that the slow axis of the support might be parallel to the polarizing axis of the membrane.

(Preparation of Liquid Crystal Display)

From a commercially available liquid crystal display of VA mode [LCD 5000], an elliptically polarizing plate was peeled. In place of it, the above-prepared elliptically polarizing plate was laminated.

With respect to the prepared display, the contrast data in all directions were measured. The viewing angle giving a contrast ratio of 20:1 was 160° (upward-downward-rightward-leftward).

EXAMPLE 4

(Preparation of Optically Biaxial Transparent Support)

45 Weight parts of cellulose acetate (average acetylation degree: 60.9%), 2.35 weight parts of the following retardation increasing agent, 2.75 weight parts of triphenyl phosphate and 2.20 weight parts of biphenyldiphenyl phosphate were dissolved in a mixed solvent comprising 232.75 weight parts of methylene chloride, 42.57 weight parts of methanol and 8.50 weight parts of n-butanol. The solution was cast on a drum to form a cellulose acetate film (dry thickness: 105 μm).

(Retardation Increasing Agent)

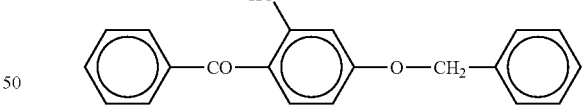

The cellulose acetate film was stretched by 20%, to prepare an optically biaxial transparent support.

The retardation values of Rth and Re of the obtained cellulose acetate film were measured at 633 nm by means of an ellipsometer [M-150, JASCO], and thereby the values of Rth and Re were found 85 nm and 40 nm, respectively.

(Preparation of Optical Compensatory Sheet)

On one surface of the transparent support, gelatin was applied to form an undercoating layer.

An aqueous solution containing the following denatured polyvinyl alcohol (2 wt. %) and glutaric aldehyde (0.1 wt. %) was applied on the undercoating layer, and the applied solution was dried to form an orientation layer of 0.5 μm thickness.

(Denatured Polyvinyl Alcohol)

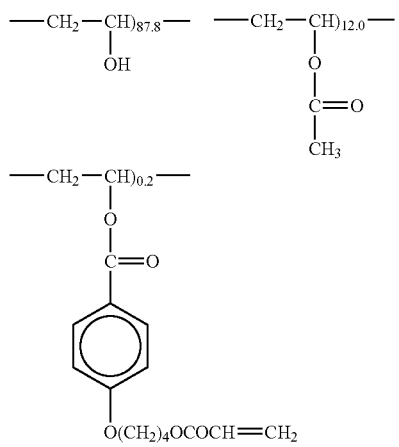

Then, 90 weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in 170 weight parts of methyl ethyl ketone to prepare a coating solution.

The coating solution was applied and dried on the orientation layer. The applied solution was heated at 130° C. for 1 minute to align the discotic liquid crystal molecules, and then irradiated with ultraviolet light (500 mJ/cm$^2$) to polymerize the discotic liquid crystal molecules. Thus, the alignment of the discotic liquid crystal molecules was fixed to form an optically anisotropic layer of 1.2 μm thickness.

The retardation values of Re and Rth of the obtained cellulose acetate film were measured at 633 nm by means of an ellipsometer [M-150, JASCO], and thereby the values of Re and Rth were found 40 nm and 160 nm, respectively.

(Preparation of Elliptically Polarizing Plate)

A polarizing membrane and a transparent protective film were overlaid in this order on the transparent support side of the optical compensatory sheet, to prepare a elliptically polarizing plate.

The polarizing membrane was placed so that the slow axis of the support might be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared elliptically polarizing plate was laminated.

With respect to the prepared display, the viewing angle giving a contrast ratio of 10:1 without image inversion was measured. The results are set forth in Table 1.

EXAMPLE 5

(Preparation of Optically Biaxial Transparent Support)

In 70 weight parts of methylene chloride, 30 weight parts of norbornene resin (Artone, JSR Co., Ltd.) was dissolved. The solution was cast on a band, and dried to form a norbornene film (dry thickness: 100 μm).

The film was longitudinally stretched by 15%, and then laterally stretched by 7% to prepare an optically biaxial transparent support.

The retardation values of Rth and Re of the obtained support were measured at 633 nm by means of an ellipsometer [M-150, JASCO], and thereby the values of Rth and Re were found 45 nm and 40 nm, respectively.

(Preparation of Optical Compensatory Sheet)

One surface of the transparent support was subjected to the corona discharge treatment. On the treated surface, an aqueous solution containing the denatured polyvinyl alcohol used in Example 4 (2 wt. %) and glutaric aldehyde (0.1 wt. %) was applied. The applied solution was dried to form an orientation layer of 0.5 μm thickness.

Then, 90 weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in 170 weight parts of methyl ethyl ketone to prepare a coating solution.

The coating solution was applied and dried on the orientation layer. The applied solution was heated at 130° C. for 1 minute to align the discotic liquid crystal molecules, and then irradiated with ultraviolet light to polymerize the discotic liquid crystal molecules. Thus, the alignment of the discotic liquid crystal molecules was fixed to form an optically anisotropic layer of 1.4 μm thickness.

The retardation values of Re and Rth of the obtained cellulose acetate film were measured at 633 nm by means of an ellipsometer [M-150, JASCO], and thereby the values of Re and Rth were found 30 nm and 120 nm, respectively.

(Preparation of Elliptically Polarizing Plate)

A polarizing membrane and a transparent protective film were overlaid in this order on the transparent support side of the optical compensatory sheet, to prepare a elliptically polarizing plate.

The polarizing membrane was placed so that the slow axis of the support might be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared elliptically polarizing plate was laminated.

With respect to the prepared display, the viewing angle giving a contrast ratio of 10:1 without image inversion was measured. The results are set forth in Table 1.

EXAMPLE 6

(Preparation of Optically Biaxial Transparent Support)

A commercially available polycarbonate film (Teijin Limited) was longitudinally stretched by 40%, and then laterally stretched by 15% to prepare an optically biaxial transparent support.

The retardation values of Rth and Re of the obtained support were measured at 633 nm by means of an ellipsometer [M-150, JASCO], and thereby the values of Rth and Re were found 100 nm and 200 nm, respectively.

(Preparation of Optical Compensatory Sheet)

One surface of the transparent support was subjected to the corona discharge treatment. On the treated surface, an aqueous solution containing the denatured polyvinyl alcohol used in Example 4 (2 wt. %) and glutaric aldehyde (0.1 wt. %) was applied. The applied solution was dried to form an orientation layer of 0.5 µm thickness.

Then, 90 weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in 170 weight parts of methyl ethyl ketone to prepare a coating solution.

The coating solution was applied and dried on the orientation layer. The applied solution was heated at 130° C. for 1 minute to align the discotic liquid crystal molecules, and then irradiated with ultraviolet light to polymerize the discotic liquid crystal molecules. Thus, the alignment of the discotic liquid crystal molecules was fixed to form an optically anisotropic layer of 3.5 µm thickness.

The retardation values of Re and Rth of the obtained optical compensatory sheet were measured at 633 nm by means of an ellipsometer [M-150, JASCO], and thereby the values of Re and Rth were found 200 nm and 300 nm, respectively.

(Preparation of Elliptically Polarizing Plate)

A polarizing membrane and a transparent protective film were overlaid in this order on the transparent support side of the optical compensatory sheet, to prepare a elliptically polarizing plate.

The polarizing membrane was placed so that the slow axis of the support might be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared elliptically polarizing plate was laminated.

With respect to the prepared display, the viewing angle giving a contrast ratio of 10:1 without image inversion was measured. The results are set forth in Table 1.

COMPARISON EXAMPLE 1

(Preparation of Optically Isotropic Transparent Support)

A commercially available cellulose triacetate film (Fuji Photo Film Co., Ltd.) was used as a transparent support.

The retardation values of Rth and Re of the support were measured at 633 nm by means of an ellipsometer [M-150, JASCO], and thereby the values of Rth and Re were found 40 nm and 3 nm, respectively. This meant that the support was essentially isotropic.

(Preparation of Optical Compensatory Sheet)

On one surface of the transparent support, gelatin was applied to form an undercoating layer. On the undercoating layer, an aqueous solution containing the denatured polyvinyl alcohol used in Example 4 (2 wt. %) and glutaric aldehyde (0.1 wt. %) was applied. The applied solution was dried to form an orientation layer of 0.5 µm thickness.

Then, 90 weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in 170 weight parts of methyl ethyl ketone to prepare a coating solution.

The coating solution was applied and dried on the orientation layer. The applied solution was heated at 130° C. for 1 minute to align the discotic liquid crystal molecules, and then irradiated with ultraviolet light to polymerize the discotic liquid crystal molecules. Thus, the alignment of the discotic liquid crystal molecules was fixed to form an optically anisotropic layer of 2.0 µm thickness.

The retardation values of Re and Rth of the obtained cellulose acetate film were measured at 633 nm by means of an ellipsometer [M-150, JASCO], and thereby the values of Re and Rth were found 3 nm and 240 nm, respectively.

(Preparation of Elliptically Polarizing Plate)

A polarizing membrane and a transparent protective film were overlaid in this order on the transparent support side of the optical compensatory sheet, to prepare a elliptically polarizing plate.

The polarizing membrane was placed so that the slow axis of the support might be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared elliptically polarizing plate was laminated.

With respect to the prepared display, the viewing angle giving a contrast ratio of 10:1 without image inversion was measured. The results are set forth in Table 1.

REFERENCE EXAMPLE 1

With respect to a commercially available liquid crystal display of MVA mode [VL-1530S, Fujitsu Ltd.], the viewing angle giving a contrast ratio of 10:1 without image inversion was measured. The results are set forth in Table 1.

TABLE 1

| MVA liquid crystal display | Retardation of optically compensatory sheet | | Viewing angle | |
|---|---|---|---|---|
| | Re | Rth | (1) | (2) |
| Example 4 | 40 nm | 160 nm | 80° | 80° |
| Example 5 | 30 nm | 120 nm | 80° | 75° |
| Example 6 | 200 nm | 300 nm | 80° | 60° |
| Comp. Ex. 1 | 3 nm | 240 nm | 80° | 55° |
| Ref. Ex. 1 | None | | 80° | 45° |

Remarks:
(1) upward-downward-rightward-leftward
(2) obliquely upward-downward-rightward-leftward

EXAMPLE 7

(Preparation of First Undercoating Layer/Transparent Support/Second Undercoating Layer)

A cellulose triacetate film was used as a transparent support.

On one surface of the support, cellulose diacetate was applied to form a first undercoating layer.

On the other surface, gelatin was applied to form a second undercoating layer.

(Preparation of First Undercoating Layer/Transparent Support/Second Undercoating Layer/Orientation Layer)

On the second undercoating layer, an aqueous solution containing polyvinyl alcohol (Poparl MP203, Kuraray Co., Ltd.) in the amount of 2 wt. % was applied and dried. The formed layer was subjected to the rubbing treatment to prepare an orientation layer of 0.5 μm thickness.

(Preparation of First Optically Anisotropic Layer/First Undercoating Layer/Transparent Support/Second Undercoating Layer/Orientation Layer)

90 Weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in methyl ethyl ketone to prepare a coating solution (solid content: 38 wt. %).

The coating solution was applied and dried on the first undercoating layer. Immediately after the applied solution was heated at 130° C. for 2 minutes to align the discotic liquid crystal molecules, the solution was cooled to room temperature and irradiated with ultraviolet light (500 mJ/cm$^2$) to polymerize the discotic liquid crystal molecules. Thus, the alignment of the discotic liquid crystal molecules was fixed to form a first optically anisotropic layer of 1.7 μm thickness.

The angle dependence of retardation of the first optically anisotropic layer was measured by means of an ellipsometer [M-150, JASCO], and thereby the inclined angle and the Rth (retardation value along the thickness direction) were found 0.2° and 88 nm, respectively.

(Preparation of Optical Compensatory Sheet Consisting of First Optically Anisotropic Layer/First Undercoating Layer/Transparent Support/Second Undercoating Layer/Orientation Layer/Second Optically Anisotropic Layer)

90 Weight parts of rod-like liquid crystal compound (N26), 10 weight parts of ethylene oxide denatured trimethlolpropanetriacrylate (V#360, Osaka Organic Chemicals Co., Ltd.), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in methyl ethyl ketone to prepare a coating solution (solid content: 38 wt. %).

The coating solution was applied and dried on the orientation layer. Immediately after the applied solution was heated at 130° C. for 2 minutes to align the rod-like liquid crystal molecules, the solution was cooled to room temperature and irradiated with ultraviolet light (500 mJ/cm$^2$) to polymerize the rod-like liquid crystal molecules. Thus, the alignment of the rod-like liquid crystal molecules was fixed to form a second optically anisotropic layer of 0.5 μm thickness.

Thus, an optical compensatory sheet was prepared.

Independently, with respect to the second optically anisotropic layer in the layered structure of first undercoating layer/transparent support/second undercoating layer/orientation layer/second optically anisotropic layer, the angle dependence of retardation was measured by means of an ellipsometer [M-150, JASCO]. As a result, the Re (retardation value in plane) was 50 nm. This meant that the rod-like liquid crystal molecules were oriented in a horizontal (homogeneous) alignment.

Further, the retardation values of Re and Rth of the obtained optical compensatory sheet were measured at 633 nm by means of an ellipsometer [M-150, JASCO], and thereby the values of Re and Rth were found 40 nm and 130 nm, respectively.

(Preparation of Elliptically Polarizing Plate Consisting of First Optically Anisotropic Layer/First Undercoating Layer/Transparent Support/Second Undercoating Layer/Orientation Layer/Second Optically Anisotropic Layer/Polarizing Membrane/Transparent Protective Film)

A polarizing membrane and a transparent protective film were overlaid in this order on the transparent support side of the optical compensatory sheet, to prepare a elliptically polarizing plate.

The polarizing membrane was placed so that the polarizing axis of the membrane might be parallel to the optical axis (average line obtained by projecting the long axes of rod-like liquid crystal molecules onto the transparent support on average) of the second optically anisotropic layer.

(Preparation of Liquid Crystal Display)

From a commercially available liquid crystal display of VA mode [LCD 5000], an elliptically polarizing plate was peeled. In place of it, the above-prepared elliptically polarizing plate was laminated.

With respect to the prepared display, the contrast data along all directions were measured. The viewing angle giving a contrast ratio of 20:1 was 160° (upward-downward-rightward-leftward). On the other hand, the viewing angle giving a contrast ratio of 20:1 in the commercially available liquid crystal display was 120° (upward-downward-rightward-leftward).

Immediately after the liquid crystal display was turned on, the displayed image was observed. The display kept displaying the image for 2 hours, and then the image was observed again to compare defects of the image with those of the initial image. As a result, there was no change between them.

EXAMPLE 8

(Preparation of Transparent Support/Undercoating Layer)

A cellulose triacetate film was used as a transparent support.

On one surface of the support, cellulose diacetate was applied to form an undercoating layer of 0.5 μm thickness.

(Preparation of Transparent Support/Undercoating Layer/First Optically Anisotropic Layer)

90 Weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in methyl ethyl ketone to prepare a coating solution (solid content: 38 wt. %).

The coating solution was applied and dried on the undercoating layer. Immediately after the applied solution was heated at 130° C. for 2 minutes to align the discotic liquid crystal molecules, the solution was cooled to room temperature and irradiated with ultraviolet light (500 mJ/cm$^2$) to polymerize the discotic liquid crystal molecules. Thus, the alignment of the discotic liquid crystal molecules was fixed to form a first optically anisotropic layer of 1.7 μm thickness.

(Preparation of Optical Compensatory Sheet Consisting of Transparent Support/Undercoating Layer/First Optically Anisotropic Layer/Second Optically Anisotropic Layer)

90 Weight parts of rod-like liquid crystal compound (N26), 10 weight parts of ethylene oxide denatured trimethlolpropanetriacrylate (V#360, Osaka Organic Chemicals Co., Ltd.), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in methyl ethyl ketone to prepare a coating solution (solid content: 38 wt. %).

After a surface of the first optically anisotropic layer was subjected to the rubbing treatment, the coating solution was applied and dried on the treated surface. Immediately after the applied solution was heated at 130° C. for 2 minutes to align the rod-like liquid crystal molecules, the solution was cooled to room temperature and irradiated with ultraviolet light (500 mJ/cm$^2$) to polymerize the rod-like liquid crystal molecules. Thus, the alignment of the rod-like liquid crystal molecules was fixed to form a second optically anisotropic layer of 0.5 μm thickness.

Thus, an optical compensatory sheet was prepared.

The retardation values of Re and Rth of the obtained optical compensatory sheet were measured at 633 nm by means of an ellipsometer [M-150, JASCO], and thereby the values of Re and Rth were found 40 nm and 130 nm, respectively.

(Preparation of Elliptically Polarizing Plate Consisting of Transparent Protective Film/Polarizing Membrane/Transparent Support/Undercoating Layer/First Optically Anisotropic Layer/Second Optically Anisotropic Layer)

A polarizing membrane and a transparent protective film were overlaid in this order on the optical compensatory sheet, to prepare a elliptically polarizing plate.

The polarizing membrane was placed so that the polarizing axis of the membrane might be parallel to the optical axis (average line obtained by projecting the long axes of rod-like liquid crystal molecules onto the transparent support on average) of the second optically anisotropic layer.

(Preparation of Liquid Crystal Display)

From a commercially available liquid crystal display of VA mode [LCD 5000], an elliptically polarizing plate was peeled. In place of it, the above-prepared elliptically polarizing plate was laminated.

With respect to the prepared display, the contrast data in all directions were measured. The viewing angle giving a contrast ratio of 20:1 was 160° (upward-downward-rightward-leftward). On the other hand, the viewing angle giving a contrast ratio of 20:1 in the commercially available liquid crystal display was 120° (upward-downward-rightward-leftward).

EXAMPLE 9

(Preparation of Transparent Support/Undercoating Layer)

A cellulose acetate (average acetylation degree: 60.9%) film was used as a transparent support.

On one surface of the support, gelatin was applied to form an undercoating layer.

(Preparation of Transparent Support/Undercoating Layer/Orientation Layer)

On the undercoating layer, an aqueous solution containing the denatured polyvinyl alcohol used in Example 4 (2 wt. %) and glutaric aldehyde (0.1 wt. %) was applied and dried. The formed layer was subjected to the rubbing treatment to prepare an orientation layer of 0.5 μm thickness.

(Preparation of Optical Compensatory Sheet Consisting of Transparent Support/Undercoating Layer/Orientation Layer/Optically Anisotropic Layer)

80 Weight parts of the discotic liquid crystal compound (1) used in Example 1, 10 weight parts of rod-like liquid crystal compound (N26), 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in 170 weight parts of methyl ethyl ketone to prepare a coating solution.

The coating solution was applied and dried on the orientation layer. The applied solution was heated at 130° C. for 1 minute to align the discotic and rod-like liquid crystal molecules, and then irradiated with ultraviolet light to polymerize the discotic and rod-like liquid crystal molecules. Thus, the alignment of the discotic and rod-like liquid crystal molecules was fixed to form an optically anisotropic layer of 1.2 μm thickness.

The retardation values of Rth and Re of the obtained optical compensatory sheet were measured at 633 nm by means of an ellipsometer [M-150, JASCO], and thereby the values of Rth and Re were found 160 nm and 40 nm, respectively.

EXAMPLE 10

(Preparation of Optically Biaxial Transparent Support)

45 Weight parts of cellulose acetate (average acetylation degree: 60.9%), 2.35 weight parts of the retardation increasing agent used in Example 4, 2.75 weight parts of triphenyl phosphate and 2.20 weight parts of biphenyldiphenyl phosphate were dissolved in a mixed solvent comprising 232.75 weight parts of methylene chloride, 42.57 weight parts of methanol and 8.50 weight parts of n-butanol. The solution was cast on a drum to form a cellulose acetate film (dry thickness: 105 μm).

The cellulose acetate film was stretched by 20%, to prepare an optically biaxial transparent support.

The retardation values of Rth and Re of the obtained cellulose acetate film were measured at 633 nm by means of an ellipsometer [M-150, JASCO], and thereby the values of Rth and Re were found 85 nm and 40 nm, respectively.

(Preparation of Optical Compensatory Sheet)

One surface of the transparent support was subjected to the corona discharge treatment. On the treated surface, a solution of 2 wt. % denatured polyimide (Nissan Chemicals Co., Ltd.) was applied. The applied solution was dried to form an orientation layer of 0.5 μm thickness. A surface of the orientation layer was subjected to the rubbing treatment.

20 Weight parts of acrylic theromotropic liquid crystal polymer was dissolved in 80 weight parts of tetrachloroethylene to prepare a coating solution.

The solution was applied on the orientation layer, heated at 160° C. for 5 minutes and cooled to room temperature, to fix the alignment of the liquid crystal molecules. Thus, an optically anisotropic layer of 1.5 μm thickness was formed.

The retardation values of Re and Rth of the obtained optical compensatory sheet were measured at 633 nm by means of an ellipsometer [M-150, JASCO], and thereby the values of Re and Rth were found 40 nm and 240 nm, respectively.

(Preparation of Elliptically Polarizing Plate)

A polarizing membrane and a transparent protective film were overlaid in this order on the transparent support side of the optical compensatory sheet, to prepare a elliptically polarizing plate.

The polarizing membrane was placed so that the slow axis of the support might be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared elliptically polarizing plate was laminated.

With respect to the prepared display, the viewing angle giving a contrast ratio of 10:1 without image inversion was measured. As a result, although the upward-downward-rightward-leftward viewing angle was 80° (which was the same as that of the commercially available liquid crystal display), the obliquely upward-downward-rightward-leftward viewing angle was 60° (while that of the commercially available liquid crystal display was 45°).

EXAMPLE 11

(Preparation of Optically Biaxial Transparent Support)

In 70 weight parts of methylene chloride, 30 weight parts of norbornene resin (Artone, JSR Co., Ltd.) was dissolved. The solution was cast on a band, and dried to form a norbornene film (dry thickness: 100 μm).

The film was longitudinally stretched by 15%, and then laterally stretched by 7% to prepare an optically biaxial transparent support.

The retardation values of Rth and Re of the obtained support were measured at 633 nm by means of an ellipsometer [M-150, JASCO], and thereby the values of Rth and Re were found 45 nm and 40 nm, respectively.

(Preparation of Optical Compensatory Sheet)

One surface of the transparent support was subjected to the corona discharge treatment. On the treated surface, an aqueous solution containing the denatured polyvinyl alcohol used in Example 4 (2 wt. %) and glutaric aldehyde (0.1 wt. %) was applied. The applied solution was dried to form an orientation layer of 0.5 μm thickness.

30 Weight parts of rod-like liquid crystal compound (N31) was dissolved in 70 weight parts of methylene chloride to prepare a coating solution.

The coating solution was applied and dried on the orientation layer. The applied solution was heated at 130° C. for 1 minute to align the rod-like liquid crystal molecules, and then irradiated with ultraviolet light to polymerize the rod-like liquid crystal molecules. Thus, the alignment of the rod-like liquid crystal molecules was fixed to form an optically anisotropic layer of 1.0 μm thickness.

The retardation values of Re and Rth of the obtained cellulose acetate film were measured at 633 nm by means of an ellipsometer [M-150, JASCO], and thereby the values of Re and Rth were found 30 nm and 120 nm, respectively.

(Preparation of Elliptically Polarizing Plate)

A polarizing membrane and a transparent protective film were overlaid in this order on the transparent support side of the optical compensatory sheet, to prepare a elliptically polarizing plate.

The polarizing membrane was placed so that the slow axis of the support might be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared elliptically polarizing plate was laminated.

With respect to the prepared display, the viewing angle giving a contrast ratio of 10:1 without image inversion was measured. As a result, although the upward-downward-rightward-leftward viewing angle was 80° (which was the same as that of the commercially available liquid crystal display), the obliquely upward-downward-rightward-leftward viewing angle was 70° (while that of the commercially available liquid crystal display was 45°).

EXAMPLE 12

(Preparation of Transparent Support)

45 Weight parts of cellulose acetate (average acetylation degree: 60.9%), 2.75 weight parts of triphenyl phosphate and 2.20 weight parts of biphenyldiphenyl phosphate were dissolved in a mixed solvent comprising 232.75 weight parts of methylene chloride, 42.57 weight parts of methanol and 8.50 weight parts of n-butanol. The solution was cast on a drum to form a transparent support (cellulose acetate film) (dry thickness: 105 μm).

The retardation values of Rth and Re of the obtained cellulose acetate film were measured at 633 nm by means of an ellipsometer [M-150, JASCO], and thereby the values of Rth and Re were found 45 nm and 3 nm, respectively.

(Preparation of Optical Compensatory Sheet)

On each surface of the transparent support, a gelatin undercoating layer was formed.

An aqueous solution containing the denatured polyvinyl alcohol used in Example 4 (2 wt. %) and glutaric aldehyde (0.1 wt. %) was applied on each gelatin undercoating layer. The applied solution was dried to form orientation layers of 0.5 μm thickness.

One of the orientation layers was subjected to the rubbing treatment.

30 weight parts of rod-like liquid crystal compound (N31) was dissolved in 70 weight parts of methylene chloride to prepare a coating solution.

The coating solution was applied and dried on the treated orientation layer. The applied solution was heated at 130° C. for 1 minute to align the rod-like liquid crystal molecules, and then irradiated with ultraviolet light to polymerize the rod-like liquid crystal molecules. Thus, the alignment of the rod-like liquid crystal molecules was fixed to form an optically anisotropic layer of 1.2 μm thickness.

The other orientation layer was subjected to the rubbing treatment in which the rubbing direction was perpendicular to that of the previous rubbing treatment.

Weight parts of rod-like liquid crystal compound (N40) was dissolved in 70 weight parts of methylene chloride to prepare another coating solution. This coating solution was applied and dried on the treated orientation layer. The applied solution was heated at 130° C. for 1 minute to align the rod-like liquid crystal molecules, and then irradiated with ultraviolet light to polymerize the rod-like liquid crystal molecules. Thus, the alignment of the rod-like liquid crystal molecules was fixed to form a second optically anisotropic layer of 2.0 μm thickness.

The retardation values of Re and Rth of the obtained optical compensatory sheet were measured at 633 nm by means of an ellipsometer [M-150, JASCO], and thereby the values of Re and Rth were found 60 nm and 120 nm, respectively.

EXAMPLE 13

(Preparation of Optical Compensatory Sheet)

A commercially available cellulose acetate film (average acetylation degree: 60.9%, Fuji Photo Film Co., Ltd.) was used as a transparent support.

On one surface of the transparent support, gelatin was applied to form an undercoating layer. On the undercoating layer, an aqueous solution containing the denatured polyvinyl alcohol used in Example 4 (2 wt. %) and glutaric aldehyde (0.1 wt. %) was applied. The applied solution was dried to form an orientation layer of 0.5 μm thickness. The orientation layer was subjected to the rubbing treatment.

30 Weight parts of rod-like liquid crystal compound (N31) was dissolved in 70 weight parts of methylene chloride to prepare a coating solution.

The coating solution was applied and dried on the treated orientation layer. The applied solution was heated at 130° C. for 1 minute to align the rod-like liquid crystal molecules, and then irradiated with ultraviolet light to polymerize the rod-like liquid crystal molecules. Thus, the alignment of the rod-like liquid crystal molecules was fixed to form an optically anisotropic layer of 1.2 μm thickness.

The optically anisotropic layer was subjected to the corona discharge treatment. On the treated surface, a solution of 2 wt. % denatured polyimide (Nissan Chemicals Co., Ltd.) was applied. The applied solution was dried to form an orientation layer of 0.5 μm thickness. A surface of the orientation layer was subjected to the rubbing treatment in which the rubbing direction was at an angle of 45° to that of the previous rubbing treatment.

30 Weight parts of rod-like liquid crystal compound (N34) was dissolved in 70 weight parts of methylene chloride to prepare another coating solution. This coating solution was applied and dried on the treated orientation layer. The applied solution was heated at 140° C. for 3 minutes to align the rod-like liquid crystal molecules, and then irradiated with ultraviolet light to polymerize the rod-like liquid crystal molecules. Thus, the alignment of the rod-like liquid crystal molecules was fixed to form a second optically anisotropic layer of 1.8 μm thickness.

The retardation values of Re and Rth of the obtained optical compensatory sheet were measured at 633 nm by means of an ellipsometer [M-150, JASCO], and thereby the values of Re and Rth were found 100 nm and 200 nm, respectively.

The invention claimed is:

1. An optical compensatory sheet having a transparent support, an optically anisotropic layer formed from liquid crystal molecules aligned in an average inclined angle of less than 5°, wherein the liquid crystal molecules comprise a mixture of discotic liquid crystal molecules and rod-like liquid crystal molecules, wherein alignments of the discotic and rod-like liquid crystal molecules are fixed, and wherein the optical compensatory sheet has a retardation value in plane defined by the following formula in the range of 10 to 1,000 nm, and a retardation value along the thickness direction defined by the following formula in the range of 10 to 1,000 nm:

$Re=(nx-ny) \times d$ $Rth=[\{(nx+ny)/2\}-nz] \times d$ in which Re is the retardation value in plane; Rth is the retardation value along the thickness direction; each of nx and ny is a refractive index in the plane of the optical compensatory sheet; nz is a refractive index along the thickness direction of the optical compensatory sheet; and d is the thickness of the optical compensatory sheet.

2. The optical compensatory sheet as defiend in claim 1, wherein the transparent support has an optically uniaxial birefringence or an optically biaxial birefringence, and an average direction of lines obtained by projecting the long axes of rod-like liquid crystal molecules in the optically anisotropic layer onto the support is essentially parallel or perpendicular to the slow axis in plane of the support.

3. An elliptically polarizing plate comprising a transparent protective film, a polarizing membrane, and an optical compensatory sheet having a transparent support and an optically anisotropic layer formed from liquid crystal molecules aligned in an average inclined angle of less than 5°, wherein the liquid crystal molecules comprise a mixture of discotic liquid crystal molecules and rod-like liquid crystal molecules, wherein alignments of the discotic and rod-like liquid crystal molecules are fixed, and wherein the optical compensatory sheet has the retardation value in plane defined by the following formula in the range of 10 to 1,000 nm, and the retardation value along the thickness direction defined by the following formula in the range of 10 to 1,000 nm:

$Re=(nx-ny) \times d$ $Rth=[\{(nx+ny)/2\}-nz] \times d$ in which Re is the retardation value in plane; Rth is the retardation value along the thickness direction; each of nx and ny is a refractive index in the plane of the optical compensatory sheet; nz is a refractive index along the thickness direction of the optical compensatory sheet; and d is the thickness of the optical compensatory sheet.

4. The elliptically polarizing plate as defined in claim 3, wherein the elliptically polarizing plate comprises the optically anisotropic layer, the transparent support, the polarizing membrane and the transparent protective film in this order.

5. A liquid crystal display comprising a liquid crystal cell of VA mode and two polarizing elements placed on both sides of the cell, wherein at least one of the polarizing elements comprises a transparent protective film, a polarizing membrane, and an optically anisotropic layer formed from liquid crystal molecules aligned in an average inclined angle of less than 5°, wherein the liquid crystal molecule comprise a mixture of discotic liquid crystal molecules and rod-like liquid crystal molecules, and wherein alignments of the discotic and rod-like liquid crystal molecules are fixed, and said optical compensatory sheet having the retardation value in plane defined by the following formula in the range of 10 to 1,000 nm, and the retardation value along the thickness direction defined by the following formula in the range of 10 to 1,000 nm:

$$Re = (nx - ny) \times d$$

$$Rth = [\{(nx+ny)/2\} - nz] \times d$$

in which Re is the retardation value in plane; Rth is the retardation value along the thickness direction; each of nx and ny is a refractive index in the plane of the optical compensatory sheet; nz is a refractive index along the thickness direction of the optical compensatory sheet; and d is the thickness of the optical compensatory sheet.

* * * * *